US012600084B2

(12) United States Patent
Wilson et al.

(10) Patent No.: US 12,600,084 B2
(45) Date of Patent: Apr. 14, 2026

(54) ADDITIVE MANUFACTURING SYSTEM

(71) Applicant: Continuous Composites Inc., Coeur d'Alene, ID (US)

(72) Inventors: Stephen Tyler Wilson, Coeur d'Alene, ID (US); John Paul Brendel, Coeur d'Alene, ID (US); Ryan C. Stockett, Spokane, WA (US); Nathan Andrew Stranberg, Post Falls, ID (US); Andrew John Overby, Coeur d'Alene, ID (US); Sam Armstrong, Coeur d'Alene, ID (US); Maxwell Joseph Johnson, Hayden, ID (US); Brennon Scott Wilsey, Spokane Valley, WA (US); Matt Howard, Coeur d'Alene, ID (US)

(73) Assignee: Continuous Composites Inc., Coeur d'Alene, ID (US)

( * ) Notice: Subject to any disclaimer, the term of this patent is extended or adjusted under 35 U.S.C. 154(b) by 264 days.

(21) Appl. No.: 18/312,234

(22) Filed: May 4, 2023

(65) Prior Publication Data

US 2023/0364856 A1 Nov. 16, 2023

Related U.S. Application Data

(60) Provisional application No. 63/364,570, filed on May 12, 2022.

(51) Int. Cl.
*B29C 64/118* (2017.01)
*B29C 64/209* (2017.01)
(Continued)

(52) U.S. Cl.
CPC .......... *B29C 64/118* (2017.08); *B29C 64/209* (2017.08); *B29C 64/218* (2017.08);
(Continued)

(58) Field of Classification Search
CPC .... B29C 64/118; B29C 64/218; B29C 64/393
See application file for complete search history.

(56) References Cited

U.S. PATENT DOCUMENTS 3,286,305 A 11/1966 Seckel
3,809,514 A 5/1974 Nunez
(Continued)

FOREIGN PATENT DOCUMENTS

DE 4102257 A1 7/1992
EP 2589481 B1 1/2016
(Continued)

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).
(Continued)

*Primary Examiner* — Ariella Machness
(74) *Attorney, Agent, or Firm* — Ryan Stockett

(57) ABSTRACT

A system is disclosed for additively manufacturing a structure. The system may have a support, and a print head operatively connected to and moveable by the support. The print head may include a first module configured to discharge a material, a second module configured to compact the material as it discharges from the first module, and a controller in communication with the second module. The controller may be configured to determine an as-discharged characteristic of the material, and to selectively adjust a force of the second module based on the as-discharged characteristic.

19 Claims, 14 Drawing Sheets

(51) Int. Cl.

| | |
|---|---|
| *B29C 64/218* | (2017.01) |
| *B29C 64/336* | (2017.01) |
| *B29C 64/393* | (2017.01) |
| *B33Y 10/00* | (2015.01) |
| *B33Y 30/00* | (2015.01) |
| *B33Y 50/02* | (2015.01) |

(52) U.S. Cl.

CPC .......... *B29C 64/393* (2017.08); *B29C 64/336* (2017.08); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 3,984,271 | A | 10/1976 | Gilbu |
| 3,993,726 | A | 11/1976 | Moyer |
| 4,137,354 | A | 1/1979 | Mayes, Jr. et al. |
| 4,643,940 | A | 2/1987 | Shaw et al. |
| 4,671,761 | A | 6/1987 | Adrian et al. |
| 4,822,548 | A | 4/1989 | Hempel |
| 4,851,065 | A | 7/1989 | Curtz |
| 5,002,712 | A | 3/1991 | Goldmann et al. |
| 5,037,691 | A | 8/1991 | Medney et al. |
| 5,121,329 | A | 6/1992 | Crump |
| 5,296,335 | A | 3/1994 | Thomas et al. |
| 5,340,433 | A | 8/1994 | Crump |
| 5,746,967 | A | 5/1998 | Hoy et al. |
| 5,866,058 | A | 2/1999 | Batchelder et al. |
| 5,936,861 | A | 8/1999 | Jang et al. |
| 6,153,034 | A | 11/2000 | Lipsker |
| 6,459,069 | B1 | 10/2002 | Rabinovich |
| 6,501,554 | B1 | 12/2002 | Hackney et al. |
| 6,799,081 | B1 | 9/2004 | Hale et al. |
| 6,803,003 | B2 | 10/2004 | Rigali et al. |
| 6,934,600 | B2 | 8/2005 | Jang et al. |
| 7,039,485 | B2 | 5/2006 | Engelbart et al. |
| 7,555,404 | B2 | 6/2009 | Brennan et al. |
| 7,795,349 | B2 | 9/2010 | Bredt et al. |
| 8,221,669 | B2 | 7/2012 | Batchelder et al. |
| 8,962,717 | B2 | 2/2015 | Roth et al. |
| 9,126,365 | B1 | 9/2015 | Mark et al. |
| 9,126,367 | B1 | 9/2015 | Mark et al. |
| 9,149,988 | B2 | 10/2015 | Mark et al. |
| 9,156,205 | B2 | 10/2015 | Mark et al. |
| 9,186,846 | B1 | 11/2015 | Mark et al. |
| 9,186,848 | B2 | 11/2015 | Mark et al. |
| 9,327,452 | B2 | 5/2016 | Mark et al. |
| 9,327,453 | B2 | 5/2016 | Mark et al. |
| 9,370,896 | B2 | 6/2016 | Mark |
| 9,381,702 | B2 | 7/2016 | Hollander |
| 9,457,521 | B2 | 10/2016 | Johnston et al. |
| 9,458,955 | B2 | 10/2016 | Hammer et al. |
| 9,511,543 | B2 | 12/2016 | Tyler |
| 9,527,248 | B2 | 12/2016 | Hollander |
| 9,539,762 | B2 | 1/2017 | Durand et al. |
| 9,579,851 | B2 | 2/2017 | Mark et al. |
| 9,688,028 | B2 | 6/2017 | Mark et al. |
| 9,694,544 | B2 | 7/2017 | Mark et al. |
| 9,764,378 | B2 | 9/2017 | Peters et al. |
| 9,770,876 | B2 | 9/2017 | Farmer et al. |
| 9,782,926 | B2 | 10/2017 | Witzel et al. |
| 10,315,355 | B2 | 6/2019 | Tyler |
| 10,315,356 | B2 | 6/2019 | Tyler |
| 10,449,711 | B2 | 10/2019 | Tyler |
| 10,603,836 | B2 | 3/2020 | Tyler |
| 10,744,707 | B2 | 8/2020 | Tyler |
| 10,744,708 | B2 | 8/2020 | Tyler |
| 10,759,109 | B2 | 9/2020 | Tyler |
| 2002/0009935 | A1 | 1/2002 | Hsiao et al. |
| 2002/0062909 | A1 | 5/2002 | Jang et al. |
| 2002/0113331 | A1 | 8/2002 | Zhang et al. |
| 2002/0165304 | A1 | 11/2002 | Mulligan et al. |
| 2003/0044539 | A1 | 3/2003 | Oswald |
| 2003/0056870 | A1 | 3/2003 | Comb et al. |
| 2003/0160970 | A1 | 8/2003 | Basu et al. |
| 2003/0186042 | A1 | 10/2003 | Dunlap et al. |
| 2003/0236588 | A1 | 12/2003 | Jang et al. |
| 2005/0006803 | A1 | 1/2005 | Owens |
| 2005/0061422 | A1 | 3/2005 | Martin |
| 2005/0104257 | A1 | 5/2005 | Gu et al. |
| 2005/0109451 | A1 | 5/2005 | Hauber et al. |
| 2005/0230029 | A1 | 10/2005 | Vaidyanathan et al. |
| 2007/0003650 | A1 | 1/2007 | Schroeder |
| 2007/0044922 | A1* | 3/2007 | Mischler ............... B29C 70/382 |
| | | | 156/577 |
| 2007/0228592 | A1 | 10/2007 | Dunn et al. |
| 2008/0176092 | A1 | 7/2008 | Owens |
| 2009/0095410 | A1 | 4/2009 | Oldani |
| 2011/0032301 | A1 | 2/2011 | Fienup et al. |
| 2011/0143108 | A1 | 6/2011 | Fruth et al. |
| 2012/0060468 | A1 | 3/2012 | Dushku et al. |
| 2012/0159785 | A1 | 6/2012 | Pyles et al. |
| 2012/0231225 | A1 | 9/2012 | Mikulak et al. |
| 2012/0247655 | A1 | 10/2012 | Erb et al. |
| 2013/0164498 | A1 | 6/2013 | Langone et al. |
| 2013/0209600 | A1 | 8/2013 | Tow |
| 2013/0233471 | A1 | 9/2013 | Kappesser et al. |
| 2013/0292039 | A1 | 11/2013 | Peters et al. |
| 2013/0337256 | A1 | 12/2013 | Farmer et al. |
| 2013/0337265 | A1 | 12/2013 | Farmer |
| 2014/0034214 | A1 | 2/2014 | Boyer et al. |
| 2014/0061974 | A1 | 3/2014 | Tyler |
| 2014/0159284 | A1 | 6/2014 | Leavitt |
| 2014/0232035 | A1 | 8/2014 | Bheda |
| 2014/0268604 | A1 | 9/2014 | Wicker et al. |
| 2014/0291886 | A1 | 10/2014 | Mark et al. |
| 2015/0136455 | A1 | 5/2015 | Fleming |
| 2016/0012935 | A1 | 1/2016 | Rothfuss |
| 2016/0031155 | A1 | 2/2016 | Tyler |
| 2016/0046082 | A1 | 2/2016 | Fuerstenberg |
| 2016/0052208 | A1 | 2/2016 | Debora et al. |
| 2016/0082641 | A1 | 3/2016 | Bogucki et al. |
| 2016/0082659 | A1 | 3/2016 | Hickman et al. |
| 2016/0107379 | A1 | 4/2016 | Mark et al. |
| 2016/0114532 | A1 | 4/2016 | Schirtzinger et al. |
| 2016/0136885 | A1 | 5/2016 | Nielsen-Cole et al. |
| 2016/0136897 | A1 | 5/2016 | Nielsen-Cole et al. |
| 2016/0144565 | A1 | 5/2016 | Mark et al. |
| 2016/0144566 | A1 | 5/2016 | Mark et al. |
| 2016/0192741 | A1 | 7/2016 | Mark |
| 2016/0200047 | A1 | 7/2016 | Mark et al. |
| 2016/0243762 | A1 | 8/2016 | Fleming et al. |
| 2016/0263806 | A1 | 9/2016 | Gardiner |
| 2016/0263822 | A1 | 9/2016 | Boyd |
| 2016/0263823 | A1 | 9/2016 | Espiau et al. |
| 2016/0271876 | A1 | 9/2016 | Lower |
| 2016/0297104 | A1 | 10/2016 | Guillemette et al. |
| 2016/0311165 | A1 | 10/2016 | Mark et al. |
| 2016/0325491 | A1 | 11/2016 | Sweeney et al. |
| 2016/0332369 | A1 | 11/2016 | Shah et al. |
| 2016/0339633 | A1 | 11/2016 | Stolyarov et al. |
| 2016/0346998 | A1 | 12/2016 | Mark et al. |
| 2016/0361869 | A1 | 12/2016 | Mark et al. |
| 2016/0368213 | A1 | 12/2016 | Mark |
| 2016/0368255 | A1 | 12/2016 | Witte et al. |
| 2017/0007359 | A1 | 1/2017 | Kopelman et al. |
| 2017/0007360 | A1 | 1/2017 | Kopelman et al. |
| 2017/0007361 | A1 | 1/2017 | Boronkay et al. |
| 2017/0007362 | A1 | 1/2017 | Chen et al. |
| 2017/0007363 | A1 | 1/2017 | Boronkay |
| 2017/0007365 | A1 | 1/2017 | Kopelman et al. |
| 2017/0007366 | A1 | 1/2017 | Kopelman et al. |
| 2017/0007367 | A1 | 1/2017 | Li et al. |
| 2017/0007368 | A1 | 1/2017 | Boronkay |
| 2017/0007386 | A1 | 1/2017 | Mason et al. |
| 2017/0008333 | A1 | 1/2017 | Mason et al. |
| 2017/0015059 | A1 | 1/2017 | Lewicki |
| 2017/0015060 | A1 | 1/2017 | Lewicki et al. |
| 2017/0021565 | A1 | 1/2017 | Deaville |
| 2017/0028434 | A1 | 2/2017 | Evans et al. |
| 2017/0028588 | A1 | 2/2017 | Evans et al. |
| 2017/0028617 | A1 | 2/2017 | Evans et al. |
| 2017/0028619 | A1 | 2/2017 | Evans et al. |
| 2017/0028620 | A1 | 2/2017 | Evans et al. |

(56)                    References Cited

U.S. PATENT DOCUMENTS

| | | |
|---|---|---|
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |
| 2018/0065300 A1 | 3/2018 | Tyler et al. |
| 2019/0022935 A1 | 1/2019 | Tooren et al. |
| 2019/0202121 A1* | 7/2019 | Budge ..................... B22F 12/53 |
| 2019/0315057 A1 | 10/2019 | Budge et al. |
| 2020/0023172 A1 | 1/2020 | Cheng et al. |
| 2020/0108554 A1 | 4/2020 | Hambling et al. |
| 2020/0156318 A1 | 5/2020 | Stranberg et al. |
| 2020/0324468 A1 | 10/2020 | Tyler |
| 2020/0368970 A1* | 11/2020 | Georgeson ............. B33Y 10/00 |
| 2021/0008817 A1 | 1/2021 | Lee et al. |
| 2021/0260821 A1 | 8/2021 | Stranberg et al. |
| 2021/0347115 A1* | 11/2021 | Fetfatsidis ........... B29C 64/295 |

FOREIGN PATENT DOCUMENTS

| | | | |
|---|---|---|---|
| EP | 3124212 | A2 | 2/2017 |
| EP | 3219474 | A1 | 9/2017 |
| GB | 2213793 | A | 8/1989 |
| KR | 100995983 | B1 | 11/2010 |
| KR | 101172859 | B1 | 8/2012 |
| WO | 2013017284 | A2 | 2/2013 |
| WO | 2016088042 | A1 | 6/2016 |
| WO | 2016088048 | A1 | 6/2016 |
| WO | 2016110444 | A1 | 7/2016 |
| WO | 2016159259 | A1 | 10/2016 |
| WO | 2016196382 | A1 | 12/2016 |
| WO | 2017006178 | A1 | 1/2017 |
| WO | 2017006324 | A1 | 1/2017 |
| WO | 2017051202 | A1 | 3/2017 |
| WO | 2017081253 | A1 | 5/2017 |
| WO | 2017085649 | A1 | 5/2017 |
| WO | 2017087663 | A1 | 5/2017 |
| WO | 2017108758 | A1 | 6/2017 |
| WO | 2017122941 | A1 | 7/2017 |
| WO | 2017122942 | A1 | 7/2017 |
| WO | 2017122943 | A1 | 7/2017 |
| WO | 2017123726 | A1 | 7/2017 |
| WO | 2017124085 | A1 | 7/2017 |
| WO | 2017126476 | A1 | 7/2017 |
| WO | 2017126477 | A1 | 7/2017 |
| WO | 2017137851 | A2 | 8/2017 |
| WO | 2017142867 | A1 | 8/2017 |
| WO | 2017150186 | A1 | 9/2017 |

OTHER PUBLICATIONS

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Erjlan Ma, Solid Freeform Fabrication of Continuous Fiber Reinforced Composite Materials, UMI Microform 3016100, Aug. 6, 2001, pp. 1-248, ProQuest Information and Learning, Ann Arbor, Michigan, USA.

Hyouk Ryeol Choi and Se-gon Roh, In-pipe Robot with Active Steering Capability for Moving Inside of Pipelines, Bloinspiration and Robotics: Walking and Climbing Robots, Sep. 2007, p. 544, I-Tech, Vienna, Austria.

International Search Report dated Nov. 17, 2022 for PCT/US2022/075956 to Continuous Composites Inc. Filed Sep. 3, 2022.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995). cited by applicant.

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-FiberCured Layer by Layer, Journal of Applied Polymer Science, vol. 123, Issue 6, pp. 3799-3805.

* cited by examiner

ADDITIVE MANUFACTURING SYSTEM

RELATED APPLICATION

This application is based on and claims the benefit of priority from U.S. Provisional Application No. 63/364,570 that was filed on May 12, 2022, the contents of which are expressly incorporated herein by reference.

TECHNICAL FIELD

The present disclosure relates generally to a manufacturing system and, more particularly, to a system for additively manufacturing a structure.

BACKGROUND

Continuous fiber 3D printing (a.k.a., CF3D®) involves the use of continuous fibers embedded within material discharging from a moveable print head. A matrix is supplied to the print head and discharged (e.g., extruded and/or pultruded) along with one or more continuous fibers also passing through the same head at the same time. The matrix can be a traditional thermoplastic, a liquid thermoset (e.g., an energy-curable single- or multi-part resin), or a combination of any of these and other known matrixes. Upon exiting the print head, a cure enhancer (e.g., a UV light, a laser, an ultrasonic emitter, a heat source, a catalyst supply, or another energy source) is activated to initiate, enhance, and/or complete curing or hardening of the matrix. This curing/hardening occurs almost immediately, allowing for unsupported structures to be fabricated in free space. When fibers, particularly continuous fibers, are embedded within the structure, a strength of the structure may be multiplied beyond the matrix-dependent strength. An example of this technology is disclosed in U.S. Pat. No. 9,511,543 that issued to TYLER on Dec. 6, 2016.

One application for continuous fibers coated with a matrix is disclosed in U.S. Pat. No. 4,137,354 that issued to Mayes, Jr. on Jan. 30, 1979 ("the '354 patent"). The '354 patent discloses a process for producing a ribbed structure known as an isogrid. The process includes laying filaments (e.g., fibers embedded with a matrix) around knurled metal pins in a repeating pattern to form interconnecting ribs that are attached to a skin. The ribs form an array of equilateral triangles, with the metal pins located at their vertexes. In one embodiment, the filaments are arranged in alternating pairs within each rib—one pair being parallel and one pair crossing. More specifically, a first filament of a first pair crosses from a left side of the rib to a right side and in so doing forms one side leg of each triangle. A second filament of the first pair crosses from the right side to the left side and in so doing forms the other side of each triangle. The two filaments cross at a center of the rib. A third filament of a second pair extends along the left side, while a fourth filament of the second pair extends along the right side. The first pair prevents separation of the rib, while the second pair increases an area moment of inertia of the rib. The structure is heated to cure the matrix after formation of the ribs.

Although the '354 patent may disclose a process that provides an isogrid structure suitable for some applications, the process and/or isogrid may be problematic in other applications. For example, the crossing filaments may create voids within the ribs that lower a performance of the structure. Further, the required use of the metal pins may increase a weight of the structure unnecessarily and/or limit a complexity of the rib structures. Additionally, the need to heat the structure after formation of the isogrid may limit a size of the structure and/or increase a cost of the process.

The disclosed print head and system are directed at addressing one or more of these issues and/or other problems of the prior art.

SUMMARY

In one aspect, this disclosure is directed towards a system for additively manufacturing a structure. The system may include a support, and a print head operatively connected to and moveable by the support. The print head may include a first module configured to discharge a material, a second module configured to compact the material as it discharges from the first module, and a controller in communication with the second module. The controller may be configured to determine an as-discharged characteristic of the material, and to selectively adjust a force of the second module based on the as-discharged characteristic.

In one aspect, this disclosure is directed towards a method of additively manufacturing a structure. The method may include discharging a material from a print head and moving the print head during discharging to form the object. The method may also include pressing a compactor against the material during discharging to compress the material, determining an as-discharged characteristic of the material, and selectively adjusting a force of the compactor toward the material based on the as-discharged characteristic.

DETAILED DESCRIPTION

The term "about" as used herein serves to reasonably encompass or describe minor variations in numerical values measured by instrumental analysis or as a result of sample handling. Such minor variations may be considered to be "within engineering tolerances" and in the order of plus or minus 0% to 10%, plus or minus 0% to 5%, or plus or minus 0% to 1% of the numerical values.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Figure 1:
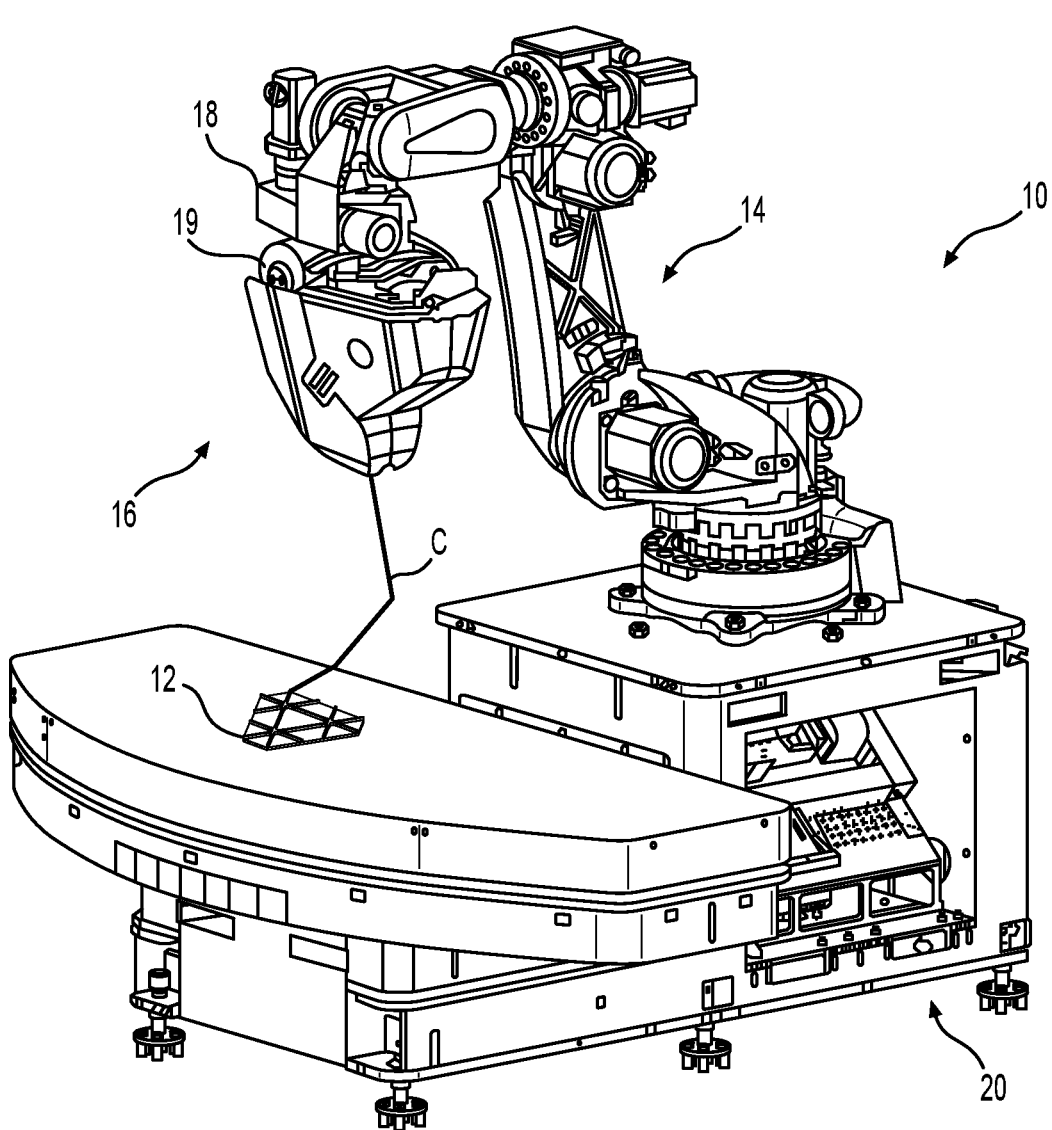
FIG. 1 is a perspective view illustration of an exemplary disclosed additive manufacturing system.

FIG. 1 illustrates an exemplary system 10, which may be used to manufacture a composite structure 12 having any desired shape, size, configuration, and/or material composition. System 10 may include at least a support 14 and a head 16. Head 16 may be coupled to and moveable by support 14 during discharge of a composite material (shown as C). In the disclosed embodiment of FIG. 1, support 14 is a robotic arm capable of moving head 16 in multiple directions during fabrication of structure 12. Support 14 may alternatively embody a gantry (e.g., a floor gantry, an overhead or bridge gantry, a single-post gantry, etc.) or a hybrid gantry/arm also capable of moving head 16 in multiple directions during fabrication of structure 12. Although support 14 is shown as being capable of moving head 16 about multiple (e.g., six) axes, it is contemplated that another type of support 14 capable of moving head 16 (and/or other tooling relative to head 16) in the same or a different manner could also be utilized. In some embodiments, a drive or coupler 18 may mechanically join head 16 to support 14 and include components that cooperate to move portions of and/or supply power and/or materials to head 16.

Head 16 may be configured to receive or otherwise contain a matrix (shown as M in FIG. 2) that, together with a continuous reinforcement (shown as R in FIG. 2), make up at least a portion of the composite material C discharging from head 16. The matrix may include any type of material that is curable and/or hardenable (e.g., a liquid resin, such as a zero-volatile organic compound resin, a powdered metal, etc.). Exemplary resins include thermosets, single- or multi-part epoxy resins, polyester resins, cationic epoxies, acrylated epoxies, urethanes, esters, thermoplastics, photopolymers, polyepoxides, thiols, alkenes, thiol-enes, and more.

In one embodiment, the matrix inside head 16 may be pressurized, for example by an external device (e.g., by an extruder or another type of pump—not shown) that is fluidly connected to head 16 via a corresponding conduit (not shown). In another embodiment, however, the pressure may be generated completely inside of head 16 by a similar type of device. In yet other embodiments, the matrix may be gravity-fed into and/or through head 16. For example, the matrix may be fed into head 16 and pushed or pulled out of head 16 along with one or more continuous reinforcements. In some instances, the matrix inside head 16 may benefit from being kept cool, dark, and/or pressurized (e.g., to inhibit premature curing or otherwise obtain a desired rate of curing after discharge). In other instances, the matrix may need to be kept warm and/or light for similar reasons. In either situation, head 16 may be specially configured (e.g., insulated, temperature-controlled, shielded, pressurized, etc.) to provide for these needs.

The matrix may be used to coat any number of continuous reinforcements (e.g., separate fibers, tows, rovings, ribbons, socks, sheets and/or tapes of continuous material) and, together with the reinforcements, make up a portion (e.g., a wall, a floor, a ceiling, infill, support, etc.) of composite structure 12. The reinforcements may be stored within (e.g., on one or more separate internal creels 19) or otherwise passed through head 16 (e.g., fed from one or more external spools—not shown). When multiple reinforcements are simultaneously used, the reinforcements may be of the same material composition and have the same sizing and cross-sectional shape (e.g., circular, square, rectangular, etc.), or a different material composition with different sizing and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that are at least partially encased in the matrix discharging from head 16.

The reinforcements may be exposed to (e.g., at least partially coated with) the matrix while the reinforcements are inside head 16, while the reinforcements are being passed to head 16, and/or while the reinforcements are discharging from head 16. The matrix, dry reinforcements, and/or reinforcements that are already exposed to the matrix (e.g., pre-impregnated reinforcements) may be transported into head 16 in any manner apparent to one skilled in the art.

In some embodiments, a filler material may be mixed with the matrix before and/or after the matrix coats the continuous reinforcements. The filler material may be selected to adjust a characteristic of the matrix and/or resulting composite material.

As will be explained in more detail below, one or more enhancers (e.g., a UV light, an ultrasonic emitter, a laser, a heater, a catalyst dispenser, a fan, and/or another source of energy) may be mounted proximate (e.g., within, on, or adjacent) head 16 and configured to enhance a cure/hardening rate and/or quality of the matrix as it discharges from head 16. The enhancer(s) may be controlled to selectively expose portions of structure 12 to the energy (e.g., to UV light, electromagnetic radiation, vibrations, heat, a chemical catalyst, etc.) during material discharge and the formation of structure 12. The energy may trigger a chemical reaction to occur within the matrix, increase a rate of the chemical reaction, sinter the matrix, harden the matrix, or otherwise cause the matrix to cure as it discharges from head 16. The amount of energy produced by the enhancer(s) may be sufficient to cure/harden the matrix before structure 12 axially grows more than a predetermined length away from head 16. In one embodiment, structure 12 is at least partially cured/hardened before the axial growth length becomes equal to an external diameter of the composite material C.

The matrix, filler, and/or reinforcement may be discharged from head 16 via one or more different modes of operation. In a first exemplary mode of operation, the matrix and/or reinforcement are extruded (e.g., pushed under pressure and/or mechanical force) from head 16 as head 16 is moved by support 14 to create the 3-dimensional trajectory within a longitudinal axis of the discharging material. In a second exemplary mode of operation, at least the reinforcement is pulled from head 16, such that a tensile stress is created in the reinforcement during discharge. In this mode of operation, the matrix may cling to the reinforcement and thereby also be pulled from head 16 along with the reinforcement, and/or the matrix may be discharged from head 16 under pressure along with the pulled reinforcement. In the second mode of operation, where the matrix is being pulled from head 16 with the reinforcement, the resulting tension in the reinforcement may increase a strength of structure 12 (e.g., by aligning the reinforcements, inhibiting buckling, distributing loading, etc.), while also allowing for a greater length of unsupported structure 12 to have a straighter trajectory. That is, the tension in the reinforcement remaining after curing of the matrix may act against the force of gravity (e.g., directly and/or indirectly by creating moments that oppose gravity) to provide support for structure 12.

The reinforcement may be pulled from head 16 as a result of head 16 being moved by support 14 away from an anchor (e.g., a print bed, a table, a floor, a wall, a surface of structure 12, etc.). For example, at the start of structure formation, a length of matrix-impregnated reinforcement may be pulled and/or pushed from head 16, deposited onto the anchor, and at least partially cured, such that the discharged material adheres (or is otherwise coupled) to the anchor. Thereafter, head 16 may be moved away from the anchor (e.g., via controlled regulation of support 14), and the relative movement may cause the reinforcement to be pulled from head 16. It should be noted that the movement of reinforcement through head 16 could be assisted (e.g., via one or more internal feed mechanisms), if desired. However, the discharge rate of reinforcement from head 16 may primarily be the result of relative movement between head 16 and the anchor, such that tension is created within the reinforcement. It is contemplated that the anchor could be moved away from head 16 instead of or in addition to head 16 being moved away from the anchor.

A controller 20 may be provided and communicatively coupled with support 14, head 16, and any number of the cure enhancer(s). Each controller 20 may embody a single processor or multiple processors that are specially programmed or otherwise configured via software and/or hardware to control an operation of system 10. Controller 20 may further include or be associated with a memory for storing data such as, for example, design limits, performance characteristics, operational instructions, tool paths, and corresponding parameters of each component of system 10. Various other known circuits may be associated with controller 20, including power supply circuitry, signal-conditioning circuitry, solenoid driver circuitry, communication circuitry, and other appropriate circuitry. Moreover, controller 20 may be capable of communicating with other components of system 10 via wired and/or wireless transmission.

One or more maps may be stored in the memory of controller 20 and used by controller 20 during fabrication of structure 12. Each of these maps may include a collection of data in the form of lookup tables, graphs, and/or equations. In the disclosed embodiment, controller 20 may be specially programmed to reference the maps and determine movements of head 16 required to produce the desired size, shape, and/or contour of structure 12, and to responsively coordinate operation of support 14, operation of the cure enhancer(s), and other components of head 16.

Figure 2:
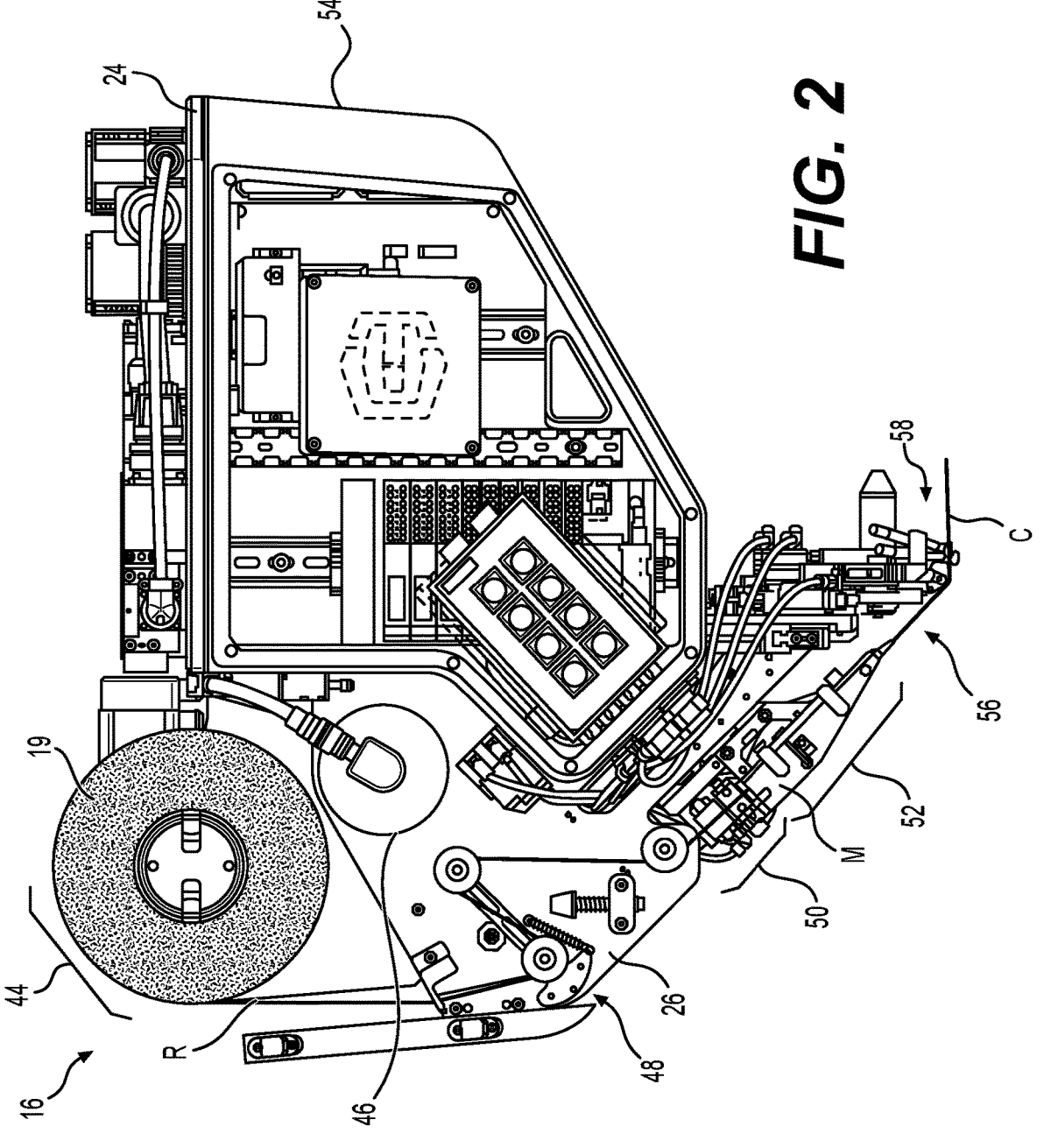
FIG. 2 is an elevation-view illustration of an exemplary disclosed print head that may form a portion of the system of FIG. 1.

An exemplary head 16 is disclosed in greater detail in FIG. 2. As shown in this figure, any number of components of head 16 may be mounted to an upper plate 24 and/or a lower plate 26. For example, a reinforcement supply module 44 and/or a matrix supply module 46 may be operatively connected to upper plate 24, while a tensioning module 48, a clamping module 50, a wetting module 52, a cutting module 56, and/or a compacting/curing module 58 may be operatively mounted to lower plate(s) 26. It should be noted that other modules and/or mounting arrangements may also be possible. As will be described in more detail below, the reinforcement may pay out from module 44, pass through and be tension-regulated by module 48, and be wetted with matrix (e.g., as supplied by module 46) during discharge through module 52. After discharge, the matrix-wetted reinforcement may be selectively severed via module 56 (e.g., while being clamped and held stationary by module 50) and thereafter compacted and/or cured/hardened by module 58.

In some embodiments, the mounting arrangement may also include an enclosure 54 configured to enclose and protect particular components of head 16 from inadvertent exposure to light, matrix, solvents, dust, and/or other environmental conditions that could reduce usage and/or a lifespan of these components. These components may include, among others, any number of conduits, valves, actuators, chillers, heaters, manifolds, wiring harnesses, sensors, drivers, controllers, input devices (e.g., buttons, switches, etc.), output devices (e.g., lights, speakers, etc.) and other similar components.

Figure 3:
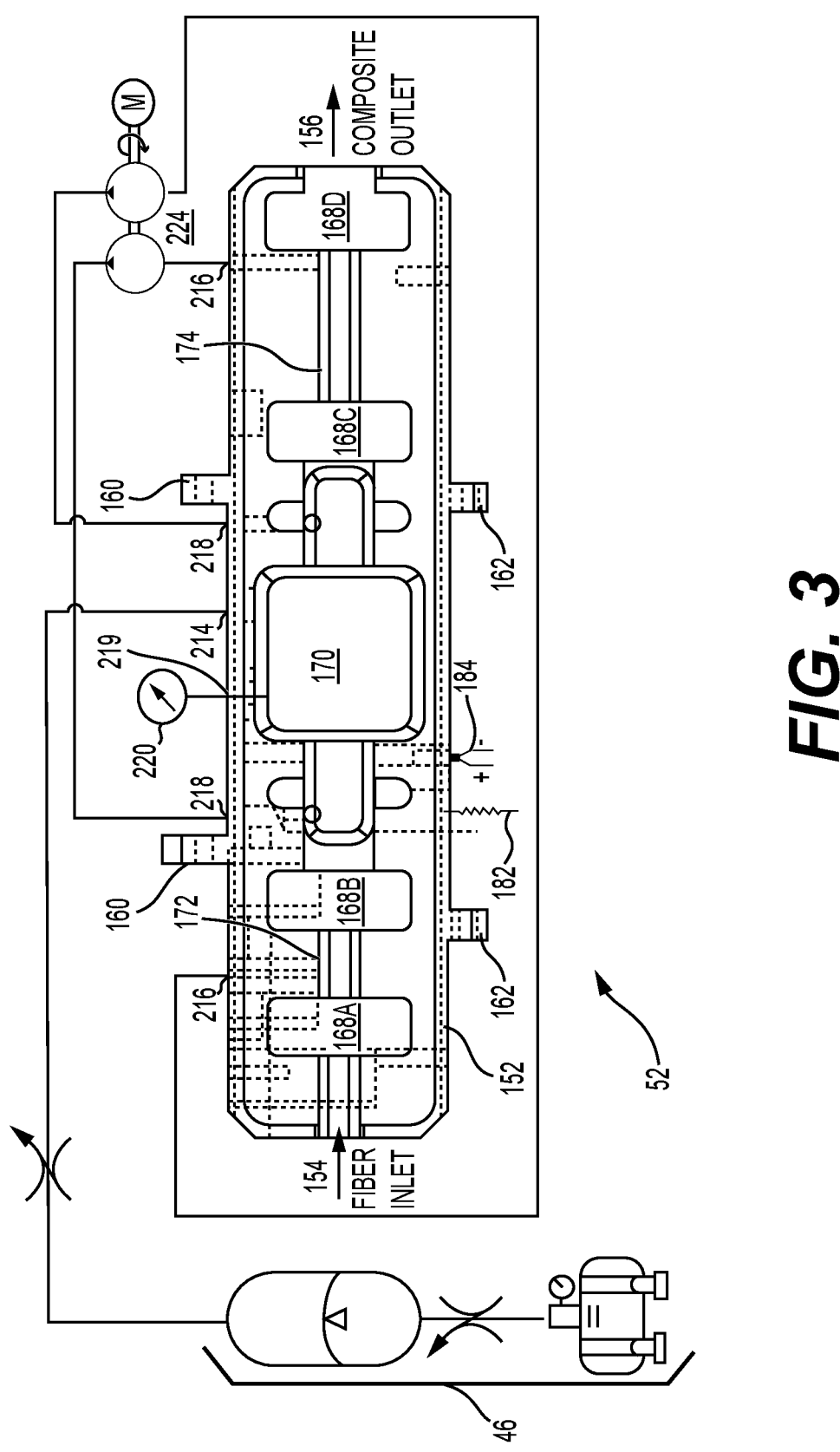
FIG. 3 is a diagrammatic illustration of an exemplary module from the print head of FIG. 2.

As shown in FIG. 3, wetting module 52 may include an elongated (e.g., elongated in a direction of reinforcement motion through module 52) base 152 having an inlet end 154 and an outlet end 156, and a lid (not shown) that is pivotally or otherwise removably connected to base 152 via one or more (e.g., two) hinges 160. A seal (not shown) may be disposed between base 152 and the lid, and any number of mechanisms (latches) 162 may connect the lid to base 152 at one or more locations (e.g., spaced apart at a side opposite hinges 160). The lid may be configured to pivot or otherwise be moved from a closed or operational position to an open or servicing (e.g., threading/cleaning) position.

Base 152 and/or the lid may include one or more features for mounting module 52 to the rest of head 16. These features may include, for example, bosses, holes, recesses, threaded bores and/or studs, dowels, etc. The number and locations of the mounting features may be selected based on a weight, size, material, and/or balance of module 52.

As shown in FIG. 3, base 152 may be configured to internally receive any number of nozzles 168 between inlet end 154 and outlet end 156. In the disclosed embodiment, four nozzles 168A, 168B, 168C and 168D are disposed in series along a trajectory of the reinforcement passing through module 52. It is contemplated, however, that a different number (e.g., a greater number or a lesser number) of nozzles 168 may be utilized, as desired. As will be explained in more detail below, nozzles 168 may function to limit an amount of matrix passing through module 52 with the reinforcement and/or to shape the reinforcement. In most instances, at least one entry nozzle 168A and at least one exit nozzle 168D should be employed to reduce undesired passage of matrix out of module 52 in upstream and downstream directions, respectively.

Nozzles 168 may divide the enclosure of module 52 into one or more chambers or sections. In the disclosed embodiment, nozzles 168 divide the enclosure into a main wetting chamber 170 (e.g., located between nozzles 168B and 168C), an upstream overflow chamber 172 (e.g., located between nozzles 168A and 168B), and a downstream overflow chamber 174 (e.g., located between nozzles 168C and 168D). As will be explained in more detail below, chamber 170 may be a primary location at which the reinforcement is intended to be wetted with matrix. While the reinforcement may additionally be wetted within each of the overflow chambers 172 and 174, these overflow chambers 172 and 174 may primarily be intended as locations where excess resin can be collected and removed from module 52. The collection and removal of excess resin from overflow chambers 172 and 174 may help to inhibit undesired leakage from module 52 at ends 154, 156.

Nozzles 168 may have different sizes and/or configurations that promote fiber wetting and resin retention under pressure. For example, nozzles 168A, 168B, and 168C may be slightly larger than 168D (e.g., have a larger internal cross-sectional area), in some applications. This may reduce tension on the reinforcement during pulling through main wetting chamber 170, yet still ensure precise control over a fiber-volume-fraction (i.e., a ratio of fiber-to-matrix known as FVF) in the material discharging from module 52. In another example, the nozzle(s) 168 located upstream of chamber 170 may have a shape that substantially matches an as-fabricated shape of the reinforcement (e.g., rectangular), while the nozzles 168 located downstream of chamber 170 may have a shape (e.g., circular or elliptical) designed to achieve a desired characteristic (enhanced steering and/or placement accuracy). It should be noted that circular or elliptical nozzles 169 may also be simpler and/or less expensive to manufacture with higher tolerances.

As shown in FIG. 3, matrix may be pumped by module 46 into chamber 170 via an inlet port 214. In some embodiments, module 46 may be selectively activated to pump matrix into chamber 170 based on a pressure detected by a sensor 220 in communication with chamber 170. For example, when a pressure within chamber 170 drops below a low threshold pressure (e.g., about 0.25-0.35 psi or about 0.29 psi), controller 20 may generate a signal activating pumping of module 46. Likewise, when a high threshold pressure (e.g., about 0.85-0.9 psi or about 0.87 psi) is reached within chamber 170, controller 20 may stop sending the signal to module 46. Pressure sensor 220 may be in communication with the matrix inside chamber 170 via a port 219 and be used to generate the above-described pressure signals.

Some of the matrix pumped into chamber 170, due to a pressure differential between chamber 170 and chambers 172 and 174, may leak upstream into chamber 172 (e.g., through and/or around nozzle 168B) and/or downstream into chamber 174 (e.g., through and/or around nozzle 168C). In addition, depending on an orientation of head 16, gravity may force matrix from chamber 170 into chamber 172 and/or 174. This excess matrix, if unaccounted for, may continue to leak in the same manner upstream and/or downstream through or around nozzles 168A and/or 168D and be lost into the environment.

To avoid waste, system contamination, and/or environmental spillage of the matrix, the excess matrix may be drained from chambers 172, 174 via one or more outlet ports 216. A low-pressure source 224 may connect with ports 216 to remove the excess matrix collected within chambers 172, 174. In some embodiments, the removed excess resin may be recirculated back into module 52 via one or more inlet ports 218. In other embodiments, the removed excess resin may be discarded.

In some applications, a temperature of module 52 (e.g., of the matrix inside of module 52) may be regulated for enhanced wetting and/or curing control. In these applications, a heater (e.g., a ceramic heating cartridge) 182 and a temperature sensor (e.g., a Resistance Temperature Detector—RTD) 184 may be utilized and placed at any desired location. In the disclosed example, heater 182 is located upstream of sensor 184, such that the matrix is heated before passing by sensor 184. The matrix may be heated to about 20-80° C. (e.g., 20-60° C.), depending on the application, the reinforcement being used, the matrix being used, and desired curing conditions. In general, a higher viscosity resin, a larger tow, and/or an opaquer reinforcement may require higher temperatures within module 52. However, care should be taken to avoid exceeding a cure-triggering threshold inside of module 52.

As discussed above, a cross-sectional area of nozzle 168 (particularly nozzle 168D) may affect the FVF of the composite material C. For example, for a given cross-sectional area A of nozzle 168D and a known cross-sectional area a of the reinforcement R, the FVF should theoretically be calculated as a/A. In demanding applications, the FVF could be 60% or higher, meaning that the area a consumes about 60% of the area A, allowing the remaining 40% of the area A to be consumed by the matrix M flowing therethrough.

However, it has been found that a pressure differential across nozzle 168D may affect the FVF of the composite material discharging therethrough. For example, for the same cross-sectional areas a and A, a higher-pressure differential can result in a lower FVF. Similarly, for the same cross-sectional areas a and A, a lower-pressure differential can result in a higher FVF. This is because the higher-pressures cause the matrix to flow through the area (A-a) at a rate faster than the rate at which the reinforcements are traveling therethrough, thereby enriching the composite material with a greater amount of matrix (and inversely decreasing the fraction of reinforcement in the material). The opposite is also true, in regard to lower pressures.

The pressure differential across nozzle 168D may be selectively modulated by controller 20 in multiple ways to adjust the FVF in real time (i.e., on the fly). For example, module 46 may be controlled to increase or decrease a pressure of the matrix supplied into primary chamber 170 (e.g., by supplying matrix at a faster or slower rate and/or directly adjusting a pressure of the matrix generated inside module 46). This change in pressure may result in more (e.g., when the pressure is higher) or less (e.g., when the pressure is lower) material passing through nozzle 168C into downstream overflow chamber 174 and a subsequent change in pressure at the upstream side of nozzle 168D. Alternatively or additionally, source 224 may be regulated to remove the excess matrix from downstream overflow chamber 174 at a slower or faster rate, thereby raising or lowering the pressure at the upstream side of nozzle 168D.

Figure 4:
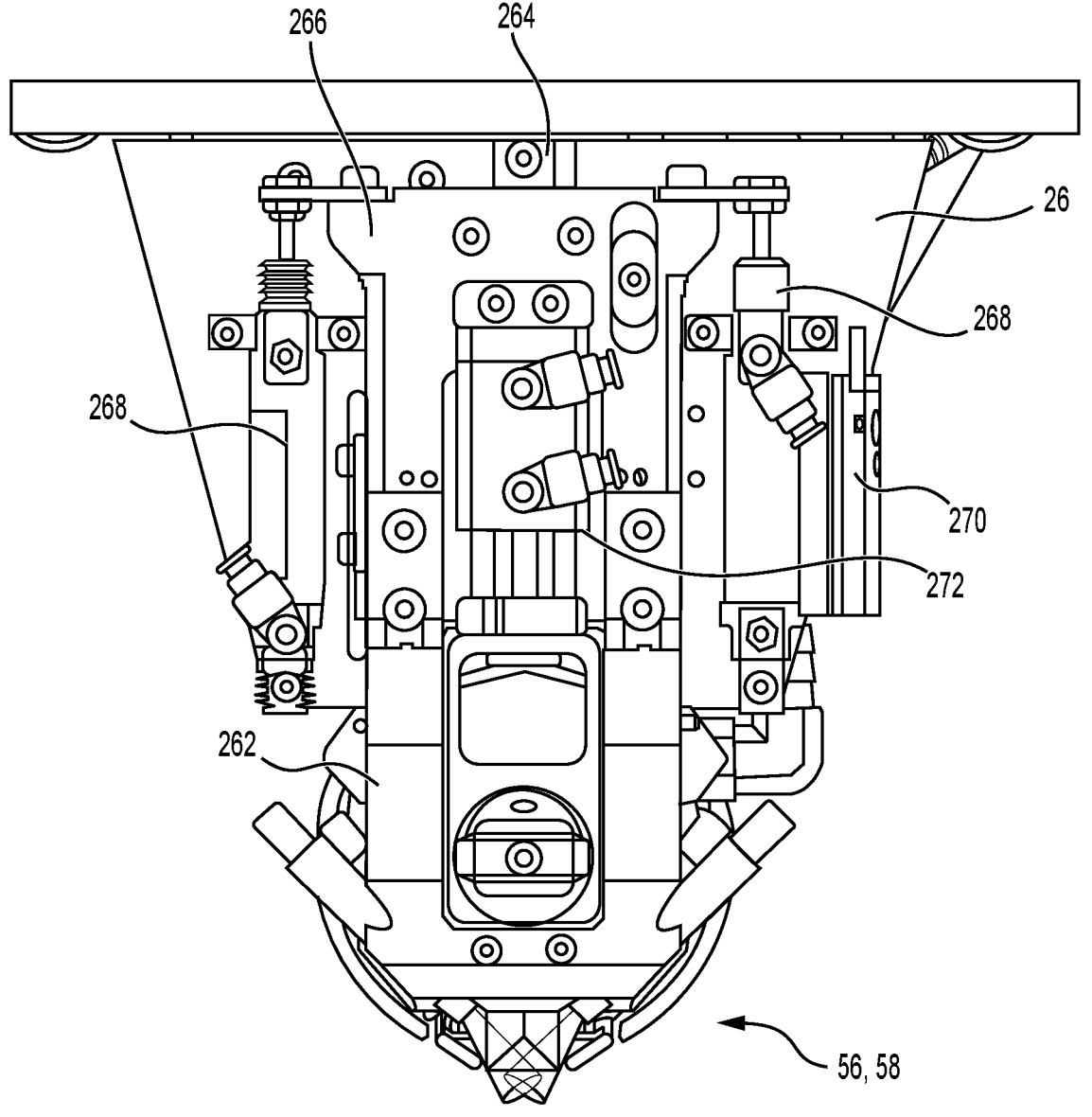
FIG. 4 is an elevation view illustration of a portion of the print head of FIG. 2.
Figure 5:
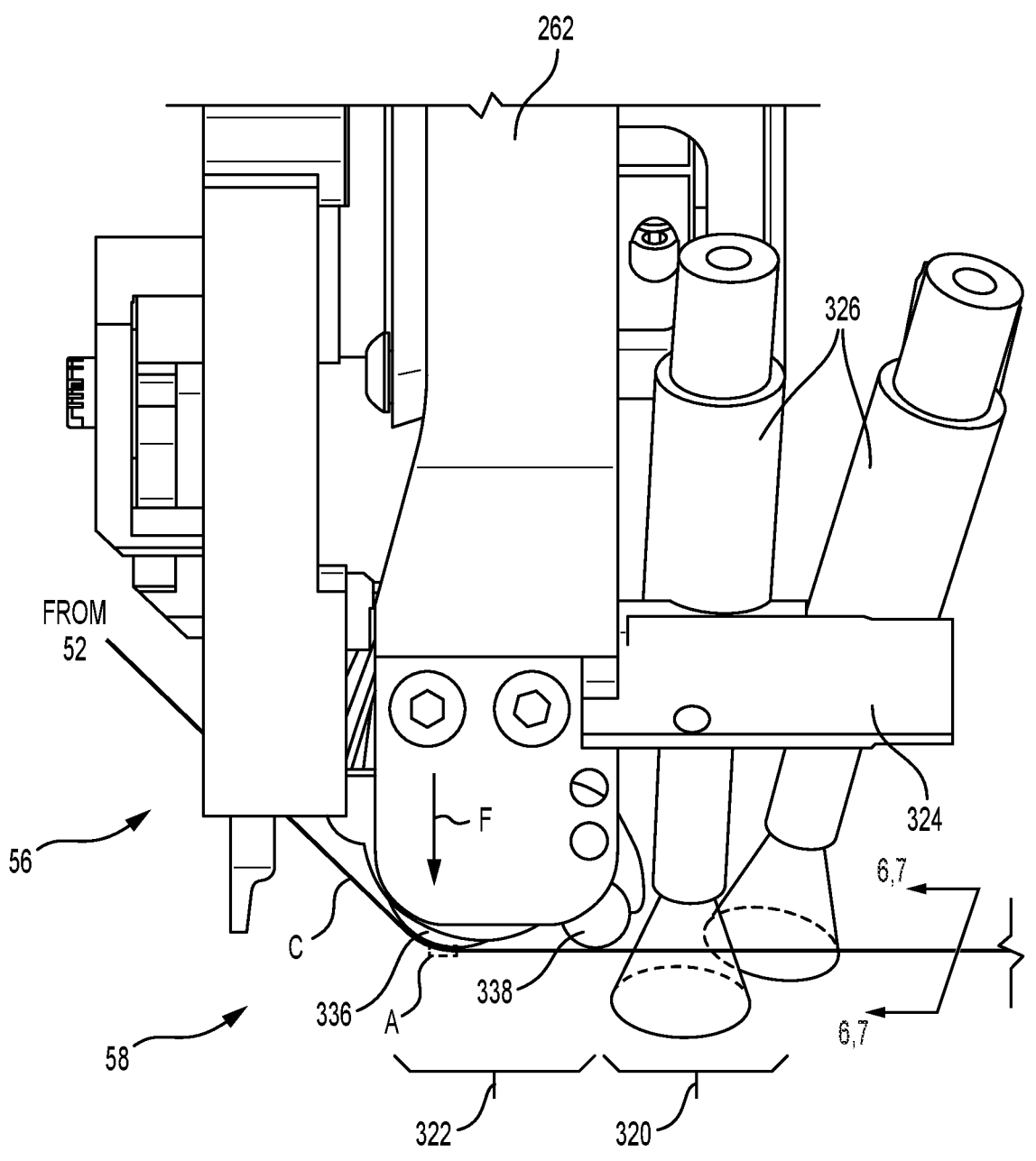
FIG. 5 is a side-view illustration of an enlargement of the portion shown in FIG. 4.

As shown in FIGS. 4 and 5, modules 56 and 58 may be configured to move together relative to module 52 and the rest of head 16. For example, a rail 264 may be affixed to lower plate 26 and oriented vertically relative to the perspective of FIGS. 4 and 5. In one embodiment, an axis of rail 264 may be generally parallel (e.g., collinear) with an axis of coupler 18 and/or a final rotation joint of support 14 (referring to FIG. 1). Each of modules 56 and 58 may be connected to a common sled or carriage 266 that is configured to roll and/or slide along rail 264 in the vertical direction, and one or more (e.g., two) actuators 268 may be connected to translate carriage 266 and modules 56, 58 together along rail 264. In one embodiment, actuator(s) 268 are directly connected to a first end of carriage 266, and modules 56 and 58 are separately connected to an opposing end of carriage 266 (e.g., module 58 may connect to carriage 266 via a bracket 262). In this embodiment, operation of the dual actuators 268 are in opposition to each other (i.e., one functioning to exert extension forces and the other functioning to exert retraction forces) to provide for enhanced control over carriage motion. It is contemplated that actuators 268 may be mounted at the same side of carriage 266 (e.g., to reduce a moment acting on carriage 266) or at opposing sides, as desired.

Actuator(s) 268 may be any type of actuators known in the art. In the disclosed example, actuators 268 are double-acting pneumatic cylinders. It is contemplated, however, that actuators 268 may or may not be cylinders, and/or actuated hydraulically, electronically, mechanically, and/or in any other manner.

During extension and retraction of actuator 268, modules 56 and 58 may be moved away from or toward the material being extruded by head 16. In some applications, it may be useful to know a location of modules 56 and/or 58 during this motion. For this reason, a sensor 270 may be positioned (e.g., mounted to plate 26 or actuator 268) to detect the location. In the disclosed embodiment, sensor 270 is associated with actuator 268 and configured to detect a position of a portion of actuator 268.

Module 56 may also be configured to selectively move relative to module 58. For example, an additional actuator 272 may extend between carriage 266 and module 56 and be configured to selectively extend module 56 further in the axial direction of rail 264.

An exemplary module 58 is illustrated in FIG. 5. As shown in this figure, module 58 may be broken down into multiple (e.g., two, three, or more) subassemblies. These subassemblies may include a curing assembly 320 and a conditioning assembly 322 that leads curing assembly 320.

As will be explained in more detail below, each of these subassemblies may be connected to bracket 262 (e.g., via one or more locating pins and/or other fasteners) to form module 58 and move together to wipe, slide, and/or roller over; compact; and/or cure the material discharging from module 52.

As shown in FIG. 5, curing assembly 320 may include, among other things, an adapter 324 configured to hold at least two (e.g., two pairs of) oppositely arranged energy transmitters 326. In the disclosed embodiment, transmitters 326 are light pipes that extend from one or more remote energy sources (e.g., light sources such as lasers, UV lights, etc.—not shown) to locations near the composite material being compacted by subassembly 322. Transmitters 326 may be held within corresponding bores of adapter 324 via resilient members (e.g., o-rings) that contract during installation and expand into corresponding annular channels within the bores upon full insertion.

Conditioning assembly 322 may include one or more rolling compactors 336 and/or one or more sliding wipers 338 that are rotationally and/or pivotally mounted to compactor(s) 336. In the disclosed embodiment, a single wiper 338 trails behind a single compactor 336 relative to a normal travel direction of head 16. It should be noted, however, that this relationship could be reversed, one of these components may be deleted, one or both of these components may be duplicated, etc., if desired. Wiper 338 may be mounted to pivot about compactor 336 and is biased (e.g., via a spring— not shown) toward the material being discharged from head 16. An outer surface of compactor 336 may be fabricated from a relatively harder and stiffer material than an outer surface of wiper 338, allowing for compactor 336 to provide a primary or larger compacting force than wiper 338 and for wiper 338 to provide a primary wiping function of matrix function. This relationship could be reversed or annulled in some applications, if desired. It should be noted, however, that wiper 338 may still provide some compaction to the material passing thereby, and that compactor 336 may still provide some smoothing of the matrix, if desired. Wiper 338, in addition to providing the matrix smoothing function and/or some compaction, may also shield the matrix from cure energy passing from transmitters 326 to the material being compacted/smoothed.

It should be noted that the described motion of wiper 338 could be different, if desired. For example, instead of a generally pivoting motion of wiper 338 about compactor 336, wiper 338 could have a linear motion in a directional generally orthogonal to the underlying material, if desired. In this embodiment, wiper 338 may still be biased (e.g., via a spring—not shown) toward the material. It may also be possible for wiper 338 to have little or no motion, and for the biasing effect to be produced solely by a compressible material (e.g., foam or rubber) of wiper 338.

The amount of compaction force applied by module 58 to the material discharging from module 52 may be dependent on several factors. These factors may include, for example, a resultant force F generated by actuators 268 in the material direction (i.e., downward direction shown in FIGS. 4 and 5) that acts through compactor 336 on the material, and also an area A of the material being compacted by compactor 336. For example, the compaction pressure may be calculated as the resultant force divided by the area (F/A).

In some applications, actuator(s) 268 may be actively controlled in real time to ensure that a desired and relatively constant (i.e., constant within engineering tolerances) pressure is applied to the material, regardless of any changes in the area A. For example, as the area A increases, actuator(s)

268 may be regulated to increase the resultant force F and thereby provide a constant compaction pressure to the material. Similarly, as the A decreases, actuator(s) 268 may be regulated to decrease the resultant force F.

The area A may change, for example, based on a change in reinforcement from a first reinforcement having a first tow width to a second reinforcement have a second tow width that is larger or smaller than the first tow width. In another example, the area A may change depending on whether the discharging material is isolated from other material and the only material being compacted or if the discharging material is being discharged adjacent previously discharged tows that will also be compacted together with the now-discharging material. Controller 20 may be configured to directly detect (e.g., via a sensor—not shown), calculate (e.g., based on a virtual model of structure 12 and/or a current path being discharged), and/or look up in the tables stored in memory, the area A and correspondingly adjust the resultant force F generated by actuators 268, such that the discharging material is consistently experiencing the same level of compaction pressure.

For example, during discharge of a first path of material making up a portion of structure 12, the area A may be small. In this instance, the force F may likewise be small (see FIG. 6—left most track), such that an actual pressure acting on the material is a desired pressure. During discharging of a second path of material adjacent the first path of material, compactor 336 may be axially long enough to span across both the first and second paths. Accordingly, the area of material being compacted by compactor 336 may be larger (e.g., doubled). In this situation, in order to achieve the same level of compaction pressure as originally applied to only the first path of material, the force generated by actuator(s) 268 may need to double. A further increase may be needed when subsequently discharging a third path of material adjacent the second, assuming that compactor 336 can simultaneously span across all three paths. As mentioned above, the area A may be detected (e.g., via a width sensor arranged in an axial direction of compactor 336), assumed based on a number of paths having been generated and counted thus far, determined based on a virtual model of structure 12 and a known progress in fabrication, looked up in the table stored in memory, and/or determined in another manner known in the art.

Figure 7:
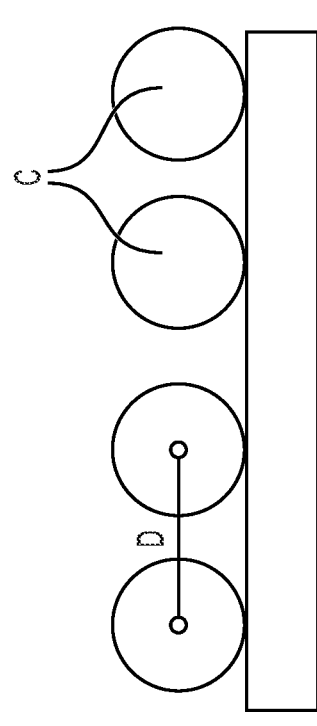
FIGS. 6, 7, 8, 9, 10, 11, 12, 13, 14, 15, 16, 17, 18, 19, 20 and 21 are illustrations of exemplary structures that may be fabricated using the system of FIG. 1.
Figure 7:
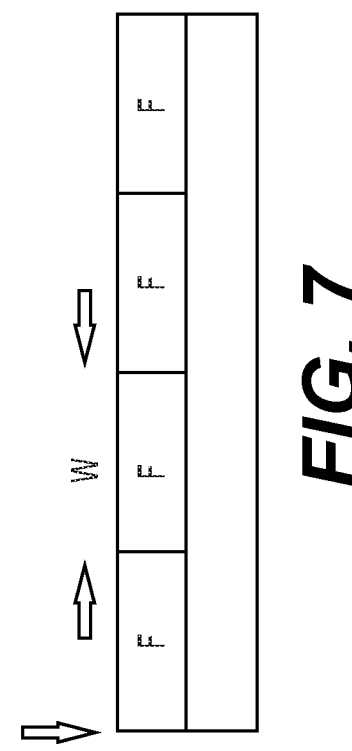
Figure 6:
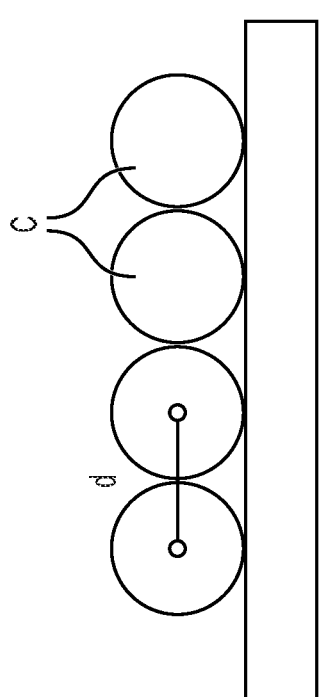
Figure 6:
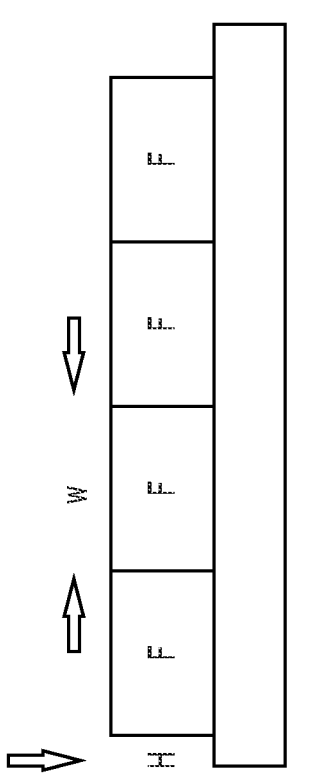

In some applications, a spacing between adjacent discharge locations may be adjusted together with the compaction force (or alone for a given compaction force) to selectively adjust a height and/or a width of the tow resulting from compaction. For example, as shown in FIG. 6, for a given dimension (e.g., diameter) of the tow discharging from module 52 (referring to FIGS. 2 and 5) and for a given spacing d between adjacent tows (e.g., between lateral centers of adjacent as-discharged tows), compactor 336 of module 58 may compact the tows to a height H and a width w. As shown in FIG. 7, for the same given diameter of the tow (and same material properties) and a greater spacing D between adjacent tows, compactor 336 may compact the tows using the same force to have a smaller height h and a greater width W. It should be noted that the relationship between the spacing, the height, and/or the width may not be linear, as the compaction force may result in a changing pressure as the resulting width (and corresponding compaction area) changes away from the as-discharged width.

Limits may be placed on acceptable tow spacing used to drive layer height and/or width. For example, a maximum spacing limit may be implemented that prevents gapping between adjacent tows after compaction. Similarly, a minimum spacing limit may be implemented that prevents significant overlapping between adjacent tows.

In some applications, a combination of force control and spacing control may be implemented to adjust layer height, path width, and/or other properties of individual paths and/or layers. For example, during discharge of a first tow, force alone may be used to set an initial desired height for the layer encompassing the first tow. Thereafter, the force may have less of an effect on layer height, whereas tow spacing between additional paths may be more influential.

Figure 8:
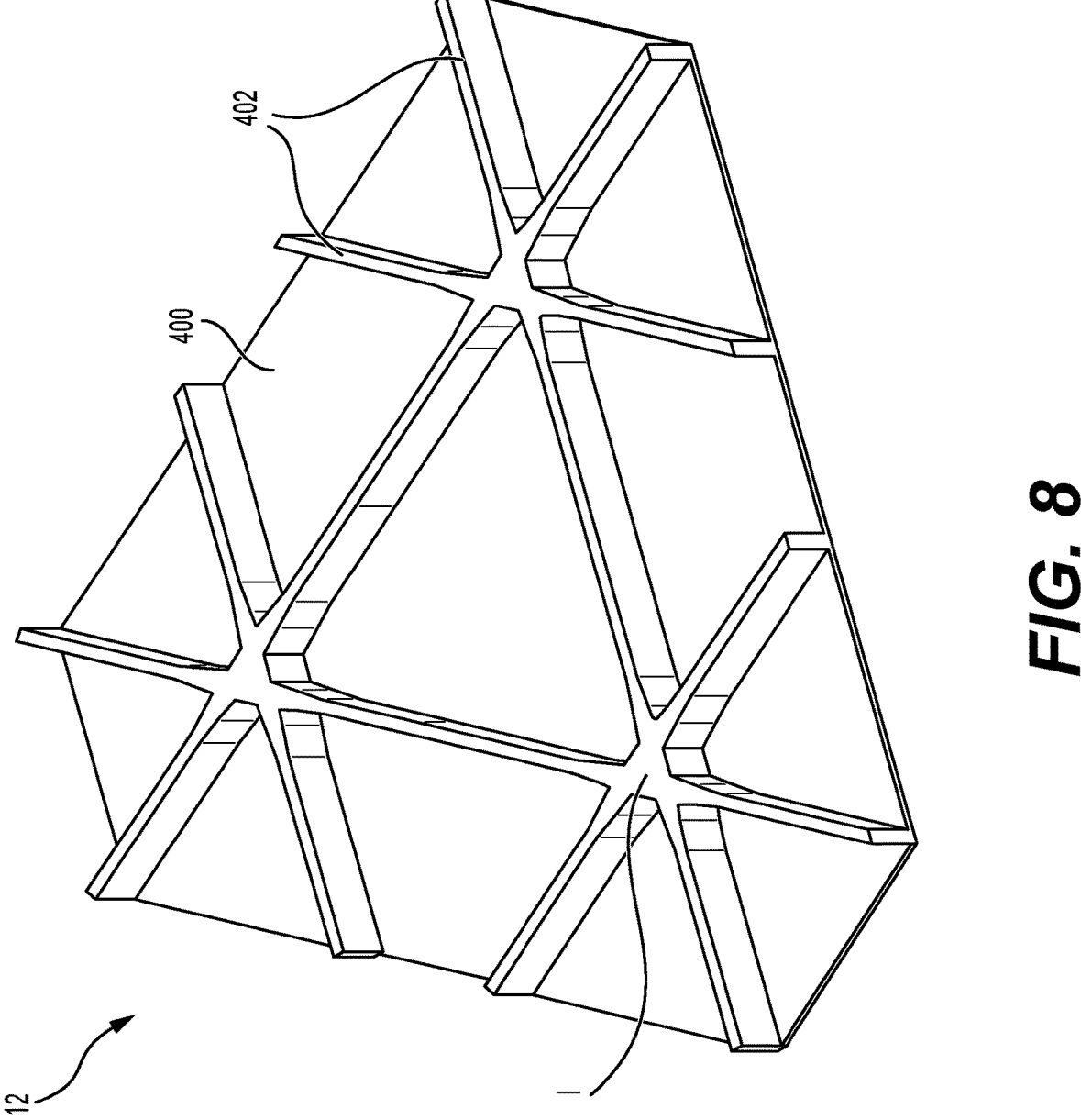

FIG. 8 illustrates an exemplary structure 12, which can be manufactured by system 10 (referring to FIG. 1). In this embodiment, structure 12 is a partially hollow component known as a grid (e.g., an isogrid) or a structural panel (e.g., a sandwich-structure-panel or SSP). In general, the grid or panel is a thin structure (i.e., a structure having a height in a direction normal to a primary surface, wherein the height dimension is less than 50%, less than 25%, less than 10%, less than 5%, or less than 1% of the shorter of a length or a width dimension of the primary surface). As an isogrid or SSP, structure 12 may be formed from one or more skins 400 and any number of stiffening ribs 402 attached to and/or disposed between (e.g., sandwiched between) opposing skins 400. In some embodiments, a spacing between ribs 402 may be left empty, while in other embodiments, the spacing may be at least partially filled with a low-density material (e.g., foam). Ribs 402 impart rigidity to panel(s) 400, while the partially hollow nature of an isogrid or SSP (e.g., the empty or low-density spacing between ribs 402) makes these components lightweight. Foam (or another low-density filler) within the space between ribs 402 may allow for improved support of panel(s) 400, such that sagging does not occur within the space during fabrication and/or so that free-spacing printing is reduced. The foam may also improve an insulating (e.g., thermally and/or acoustically insulating) factor of structure 12.

Skin 400, while shown in FIG. 8 as generally planar, may have any desired (e.g., three-dimensional) contour. For example, each skin 400 may have a convex shape, a concave shape, a cylindrical shape, and/or a complex shape (e.g., a combination of multiple different planar and/or nonplanar shapes). The nonplanar contours may be achieved, for example, by printing skin 400 at least partially into free-space (e.g., without an intervening support, over or between ends of a contoured rib pattern, etc.) and/or into a corresponding mold. In addition, when adjacent skins 400 of the same structure 12 are spaced apart from each other by conjoined ribs 402, skins 400 may be parallel/mirror images of each other or nonparallel and different, as desired. Each skin 400 may be a continuous or discontinuous surface (e.g., a surface with steps between heights, openings, etc.).

Ribs 402 may be bonded to skin(s) 400 and have a height that extends in a direction normal to the corresponding surface(s) of skin(s) 400. The height of the extension may be generally consistent across an area of the panel(s) 400 or may be variable to accommodate nonplanar and/or non-mirrored skin(s) 400. It should be noted that, while the exemplary structure 12 illustrated in FIG. 8 includes ribs 402 arranged in a traditional triangular pattern (e.g., made of identical isosceles triangles connected to each other at their vertices) of an isogrid, ribs 402 could alternatively be arranged in a honeycomb pattern, a rectangular pattern, a cylindrical pattern, an elliptical pattern, another symmetric or non-symmetric geometric pattern, and/or a repeating or non-repeating combination of these closed-cell patterns, as desired. It is also contemplated that the pattern of ribs 402 may not be formed solely from closed cells, in some embodiments. That is, the pattern of ribs 402 could include some closed cells in combination with non-cellular formations (e.g., sinusoidal extensions, disconnected linear extensions, etc.) or only non-cellular formations, if desired.

In the example of FIG. 8, ribs 402 may have side walls that are perpendicular to the skin(s) 400 to which they are attached (e.g., having a neutral draft). In addition, a cross-section of ribs 402 (including their intersections—I) may remain substantially identical throughout the height direction. It should be noted, however, that other configurations may also be possible.

Figure 9:
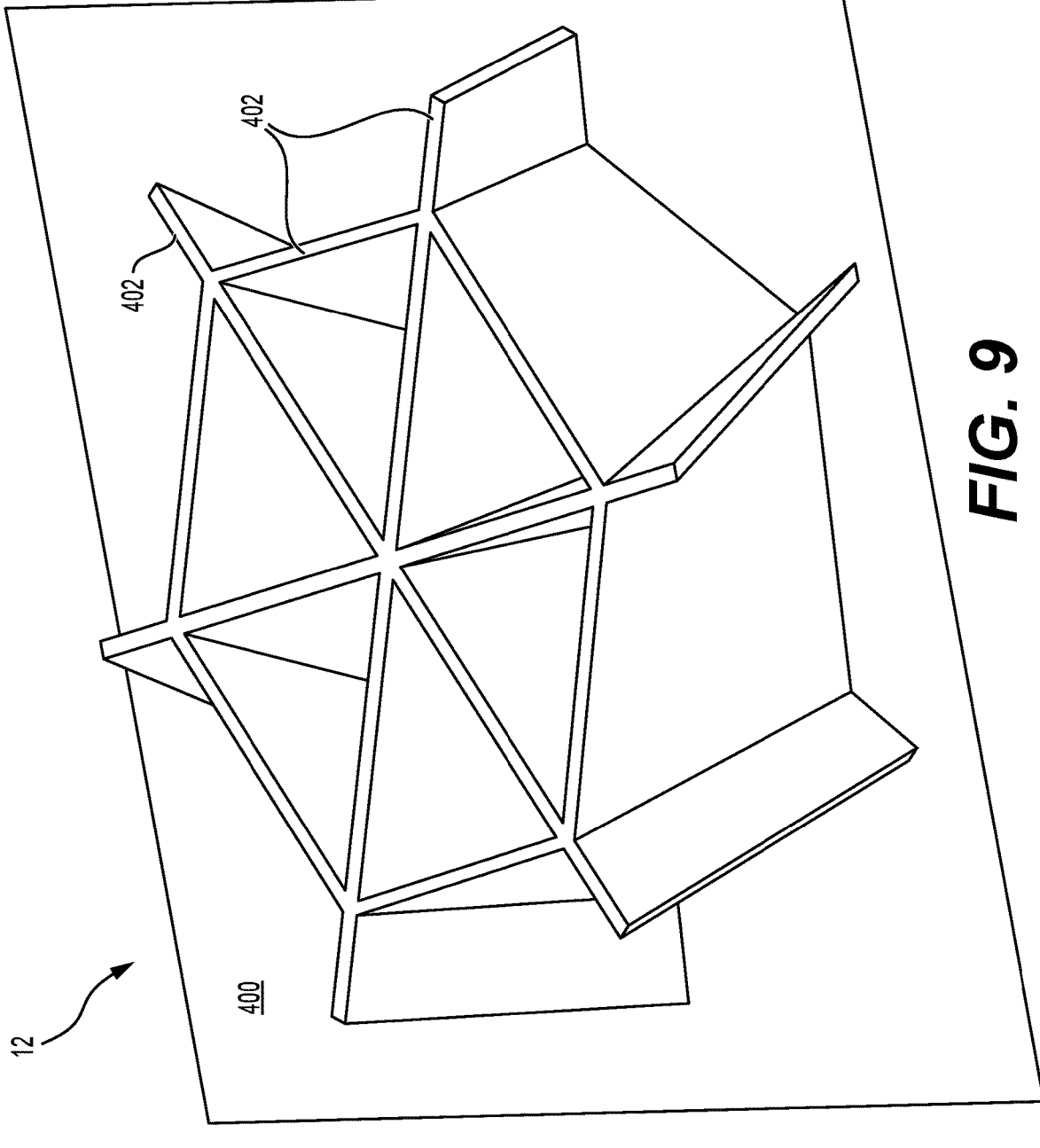

For example, FIG. 9 illustrates example ribs 402 having side walls that are not perpendicular (e.g., negative or positive draft). Similarly, structure 12 of FIG. 9 has a cross-section that varies in relation to height away from skin 400. This geometry and/or physical capability may improve strength of structure 12 and/or design flexibility.

As discussed above, ribs 402 may be made up of any combination of repeating or non-repeating geometric patterns. Depending on the pattern selected, each intersection I within the pattern may have a different number of legs extending therefrom. In the example of an isogrid having a repeating pattern of isosceles triangles (shown in FIG. 8), each intersection I in the pattern is formed by 6 different triangles. In order to inhibit the intersections from building up to a greater thickness than the rest of ribs 402, the legs of the 6 triangles that meet at each intersection should have a pattern that varies between layers.

Figure 10:
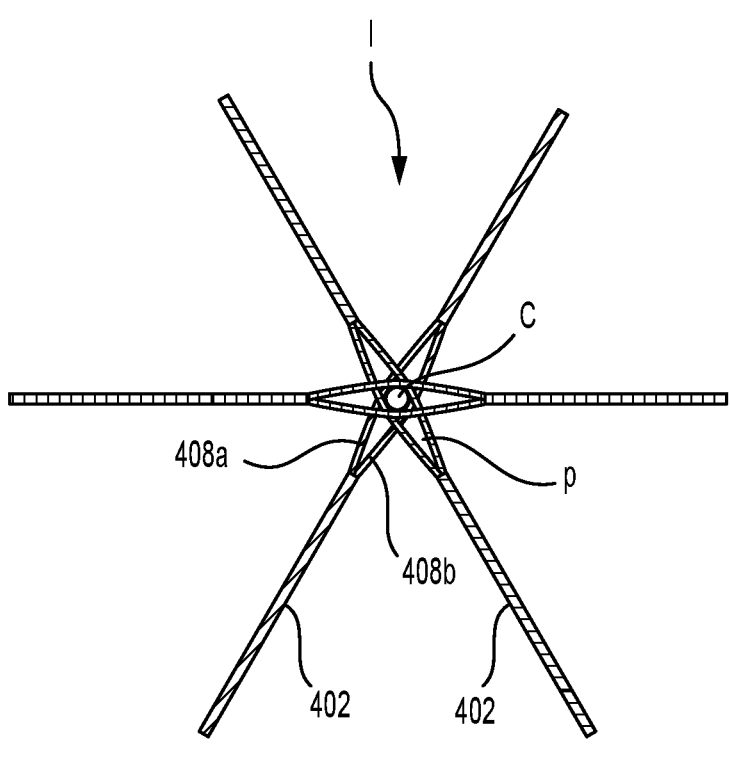

In a first example shown in FIG. 10, the legs of all of the triangles within every layer avoids a center C of the intersection I. As a result, a generally cylindrical void is created at the center C that can be filled with matrix and/or hardware (a boss, a fastener, a pin, a threaded insert, etc.) or left empty. The matrix may be used to transfer loads between the different legs, while the hardware may be used to connect structure 12 to another object. An opening at the center C may be used as a duct to transport materials through structure 12. The legs of the triangles avoid the center C of the intersection I by deviating either to the left or right of the void. For example, the leg of a first triangle within a first layer 408a of ribs 402 may deviate to the left, while the same leg of the same triangle with a second and overlapping layer 408b may deviate to the right. In this manner, although deposition of two layers of composite material along all of ribs 402 may result in 12 leg overlaps at each intersection I, the overlap locations may be distributed around the void and result in only a buildup at each overlap location that is equal in height to only two layers.

It should be noted that the generally cylindrical void at the center C in the embodiment of FIG. 10 may be omitted, if desired. For example, the legs may lie immediately adjacent each other at the center (e.g., still deviating to one side of a center point, but with no space therebetween), such that no void exists.

While the configuration of FIG. 10 may be fully symmetrical about the center C of the intersection I and inhibit undesired buildup, the configuration may also result in excessive porosity. That is, with the legs of each triangle being separated at the intersection I by the diameter of the void, triangularly shaped pores p may extend away from the void along the axial direction of each leg. This porosity, even when filled with excess matrix, may reduce a strength of structure 12. In addition, the excess matrix may increase a weight of structure 12.

Figure 11:
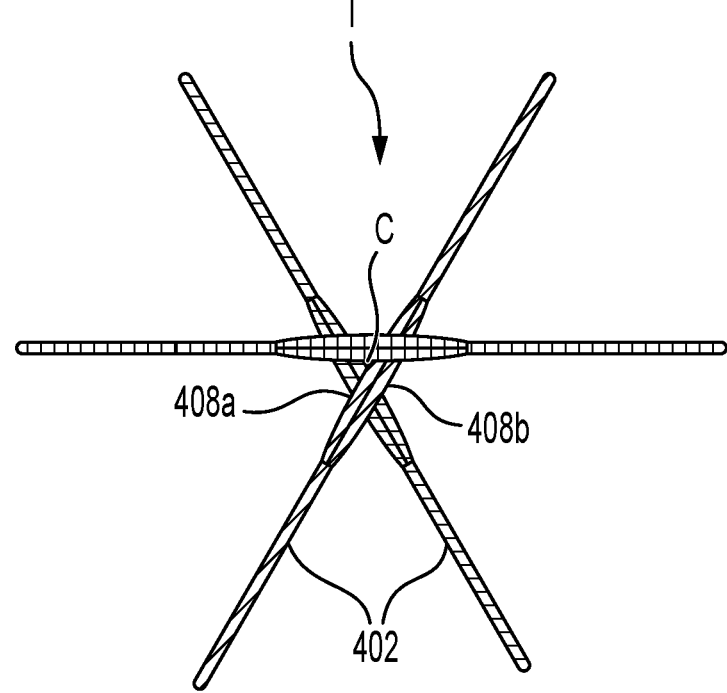

FIG. 11 illustrates an alternative design, in which all overlapping legs within different layers of the same triangle deviate to one side of the center C (e.g., to the right). In this configuration, overlapping legs deviate to the same side by differing amounts, such that the legs are adjacent and do not lie directly on top of each other around the intersection I. The amount of deviation between corresponding legs of the same triangle that are within overlapping layers is only enough to place the legs next to each other without significant (e.g., without any) gapping therebetween. As can be seen in FIG. 11, this arrangement may allow for elimination of the center void and/or of triangular spaced pores between the legs. This may increase a strength and/or reduce a weight of structure 12.

Figure 18:
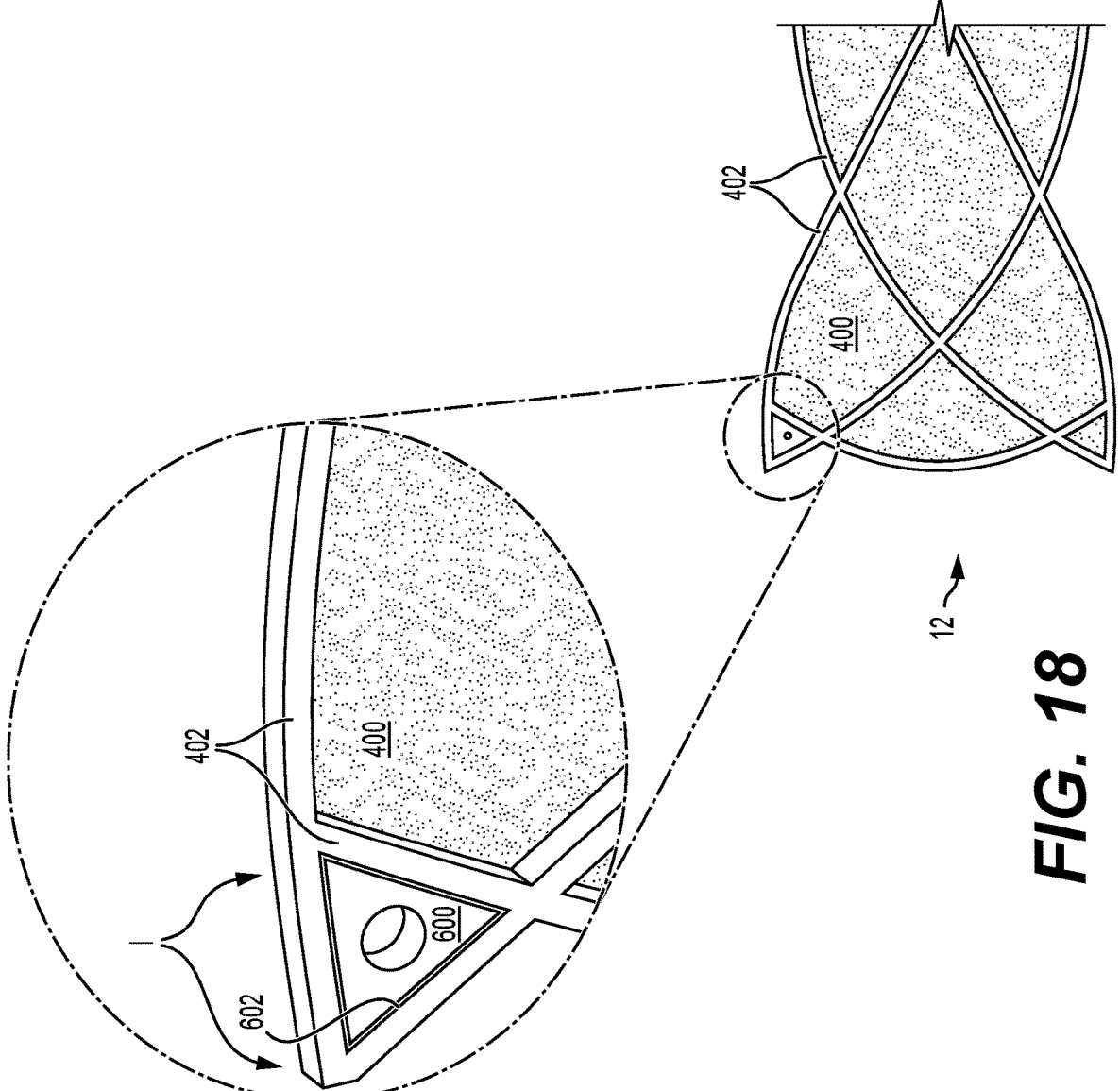

It should be noted that, while symmetrical intersections I (e.g., intersections having substantially identical legs extending from a center, with equal angles therebetween) have been illustrated in FIGS. 8-11 and described above, the intersections need not be symmetrical. For example, as shown in FIG. 18, the intersections I have different numbers of ribs 402 extending therefrom and the angles between ribs 402 are different. Ribs 402 can be straight or curved and lie within a plane or extend into three dimensions. Ribs 402 may also have different thicknesses and/or heights within the same structure 12.

An isogrid and/or SSP-type structure 12 may be fabricated using system 10 in multiple different ways. For example, a first skin 400 of structure 12 may be fabricated (e.g., discharged from head 16 against a flat or contoured print surface, compacted, and at least partially cured) first; ribs 402 may then be fabricated against the first skin 400; and then, in some applications, an additional second skin 400 may be fabricated against ribs 402 at a side opposite the first skin 400 (e.g., by extending through free-space over the extending portions of ribs 402). Alternatively, ribs 402 may be fabricated first, followed by fabrication of the first and/or second skins 400. In some applications, curing of the different parts of structure 12 may be only partially completed (e.g., left in a green or semi-green state that holds its shape), such that the entire structure 12 is thereafter through-cured together as a monolithic structure. As will be explained in more detail below, in some applications, only portions of a particular skin 400 may be fabricated, followed by portions of ribs 402, and then additional portions of the same skin 400. It is contemplated that the materials used to fabricate panel(s) 400 may be the same or different from the materials used to fabricate ribs 402.

Figures 12, 13:
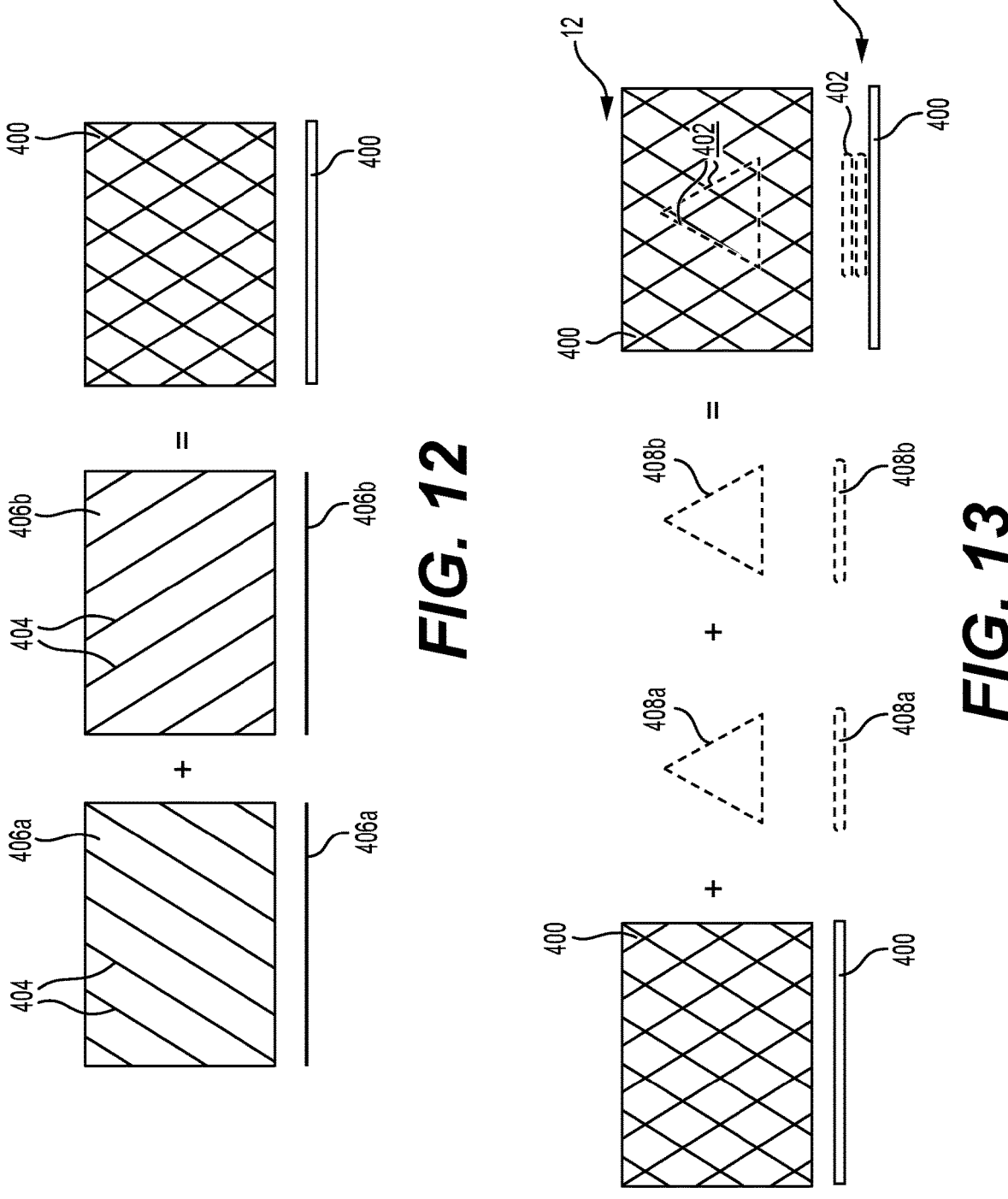

In one application, formation of a skin 400 within structure 12 may include discharge of multiple adjacent paths 404 of composite material (i.e., continuous reinforcement(s) R at least partially coated with matrix M) within one or more overlapping layers 406. For example, FIG. 12, shows a single skin 400 fabricated from first and second overlapping layers 406a and 406b, each consisting of multiple adjacent paths 404 of composite material. It should be noted that skin 400 may include any number of layers 406, and that the paths 404 within each of the layers 406 may have any trajectory and be the same or different. Paths 404 may be immediately adjacent to each other (i.e., without significant spacing therebetween) or include intentional gaps therebetween, as desired. In some embodiments, that number of layers 406 and/or trajectories of paths 404 within the respective layers may be selected such that skin 400 has general consistent performance parameters (e.g., isotropic or quasi-isotropic stiffness, strength, etc.) in each direction within skin 400. In other embodiments, however, the number of layers 406 and/or the trajectories of paths 404 within layers 406 may be selected to provide anisotropic performance parameters within skin 400.

As shown in FIG. 13, after formation of skin 400, any number of layers (e.g., a first layer 408a and a second layer 408b) of composite material may be deposited against an exposed surface of skin 400 to form ribs 402, along borders of the associated geometric pattern(s). It is contemplated that each layer 408 of ribs 402 may be the same (e.g., lie partially or entirely on top of each other) or different (e.g., cross over, but not lie directly on top of each other). After a desired number of layers 408 have been deposited, formation of structure 12 as a grid (isotropic or anisotropic grid) may be complete. However, if a sandwich type panel is desired, the same or a similar process depicted in FIG. 12 may be repeated to form a substantially identical or different second skin 400 at a side of ribs 402 opposite the first panel. As discussed above, it is contemplated that ribs 402 could alternatively be formed first, after which one or two skins 400 could be formed at the sides of ribs 402, if desired.

Figure 14:
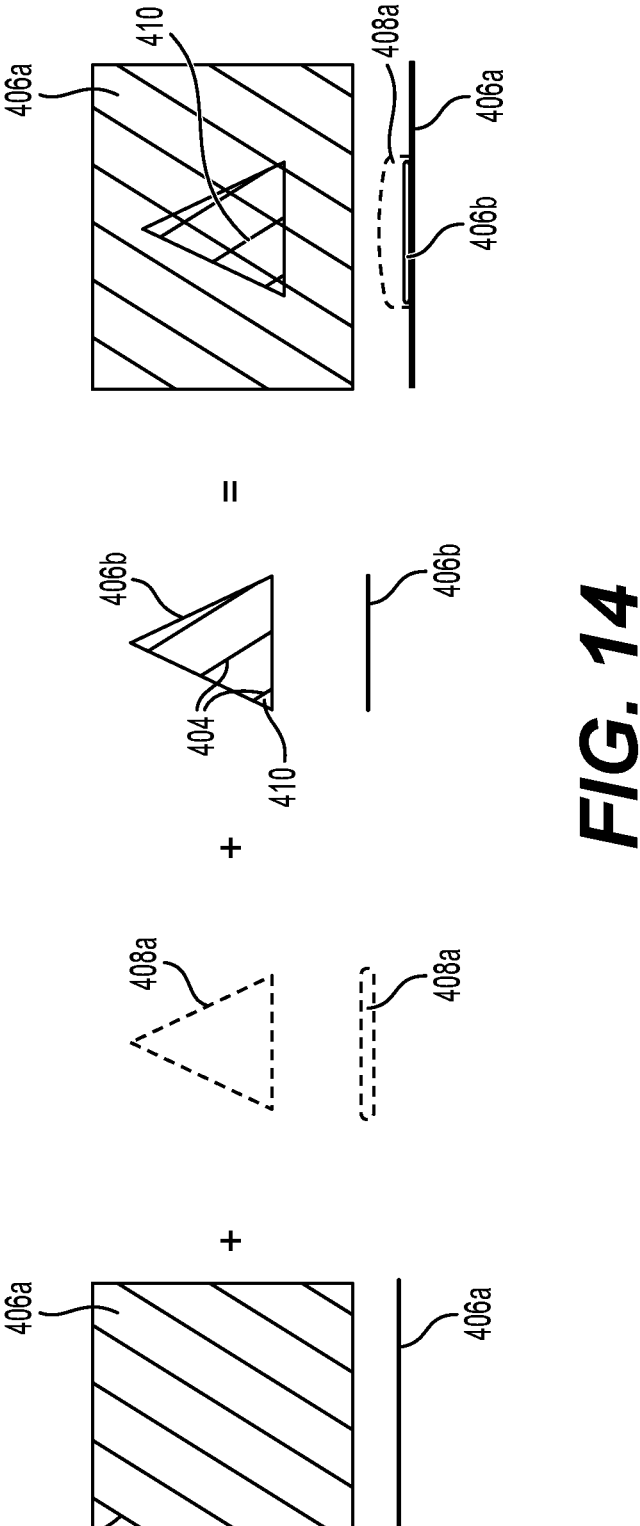

It is contemplated that only a portion (e.g., only one or more layers 406—referring to FIG. 14) of skin 400 may be formed prior to formation of some or all (e.g., one or more layers 408) of ribs 402, followed by additional formation (e.g., completion) of skin 400, in some embodiments. For example, after formation of at least one layer (e.g., a base layer 406a) of skin 400 and at least one layer 408 of ribs 402 on top of base layer 406a, an additional layer (e.g., layer 406b) of skin 400 may be formed. In the embodiment of FIG. 14, the additional layer 406b of skin 400 may be formed from the open-side of structure 12 and placed immediately adjacent other layers 406 of the same skin 400. For example, the additional layer 406b may be discharged into the empty space(s) within and/or between the geometric shapes of ribs 402 (e.g., inside of each triangle) and against the previously discharged base layer 406a. In the example of FIG. 14, the additional layer 406b may be interrupted by ribs 402, such that multiple separate discontinuous sections 410 make up layer 406b. In this example, each section 410 may be the same (e.g., have a same number/spacing/trajectories of paths 404) or different to provide different performance characteristics across an area of skin 400. In other words, skin 400 may have different thicknesses (e.g., thinner) adjacent and (e.g., thicker) between ribs 402.

Figure 15:
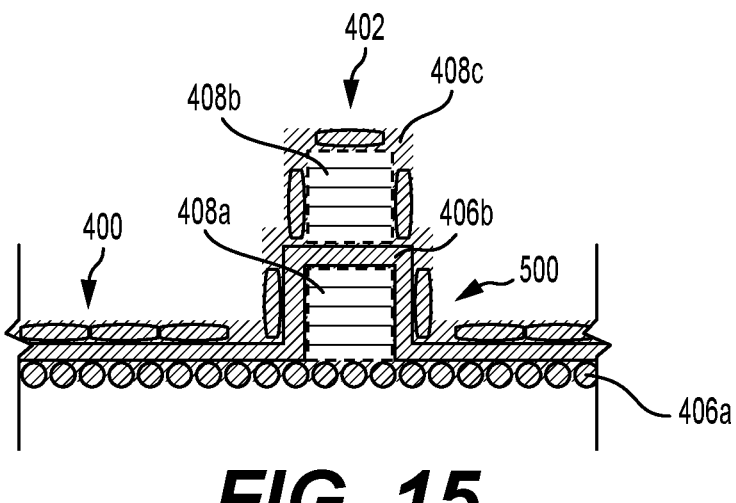

In another example shown only in cross-section in FIG. 15, the additional layer(s) 406b may be continuous and extend over at least a portion (e.g., one or more layers 408) of ribs 402. In this example, the additional layer(s) 406 may function as intermediate locking mechanisms to help bond ribs 402 to skin 400.

As mentioned above, ribs 402 may have geometry that varies in the height direction. For example, a particular rib 402 may have a base or "noodle region" 500 adjacent skin 400 that is wider than a distal portion away from skin 400. The cross-section of rib 402 may gradually taper or step inward from region 500 toward the distal portion, as desired. In some embodiments having opposing skins 400 separated by ribs 402, one or more of ribs 402 may include dual noodle regions (e.g., one region 500 located at each skin 400) separated from each other by a thinner middle region. In addition, the geometry of a particular rib 402 may vary along a length of the rib. For example, the noodle region(s) and/or middle region may become thicker (e.g., wider in a direction parallel with the surface of skin 400) at intersections I to provide a greater load-carrying capacity.

Figure 16:
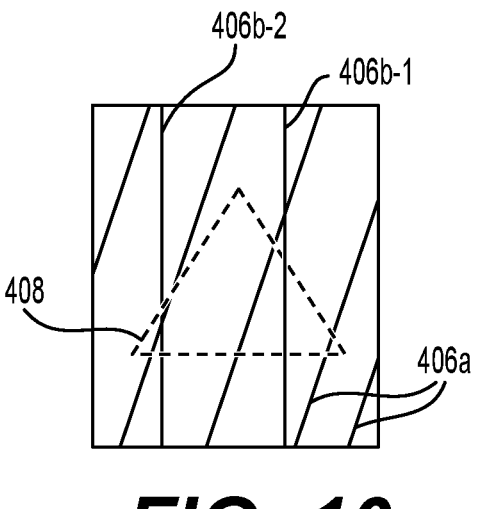
Figure 17:
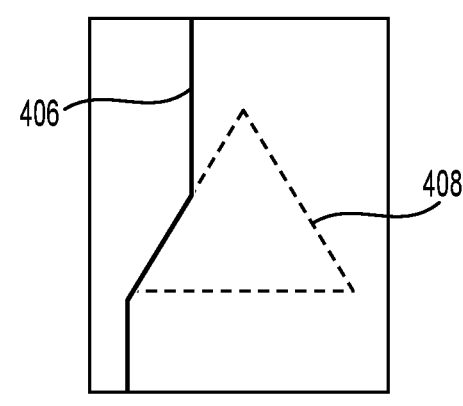

In an additional example illustrated in FIG. 16, only particular path(s) 406b-1 of particular layer(s) 406b may extend over some portions or all of particular layer(s) 408 of rib 402, while the remaining path(s) 406b-2 of the same layer(s) 406b may be truncated at ribs 402. In a final example illustrated in FIG. 17, one or more paths 406 of one or more layers may extend into and form a portion or all of ribs 408. This integral formation may increase a bond strength between skin 400 and ribs 402.

It is contemplated that the reinforcements utilized for each portion of skin 400 may be selected to provide for a particular functional characteristic corresponding to its use. For example, the reinforcement used as the outer layer of skin 400 may be fabricated from a first material (e.g., carbon) and provide a first functional characteristic (e.g., UV resistance); the reinforcement used as a locking layer may be fabricated from a second material (e.g., SiC) and provide a second functional characteristic (e.g., hardness); a third reinforcement used as the inner layer of may be fabricated from a third material (e.g., glass) and provide a third functional characteristic (e.g., corrosion resistance); and a fourth reinforcement used to form ribs 402 may be fabricated from a fourth material (e.g., Kevlar) and provide a fourth functional characteristic (e.g., flexibility).

In some applications, an insert 600 of another material (e.g., a different composite material and/or a non-composite material) may be used in conjunction with the composite material discharged by head 16 during fabrication of structure 12. Insert 600 may provide a harder, stronger, more wear-resistant point of attachment that can be used to assemble components to structure 12 and/or to assembly structure 12 to another structure. As shown in the embodiment of FIG. 18, insert 600 may be shaped to fit within a pre-fabricated pocket 602 of structure 12. In some applications, insert 600 may be bonded into the pocket (e.g., with matrix or another adhesive). In other applications, the composite material making up ribs 402 may be deposited around insert 600 and cured to lock insert 600 in place.

Figures 19, 20, 21:
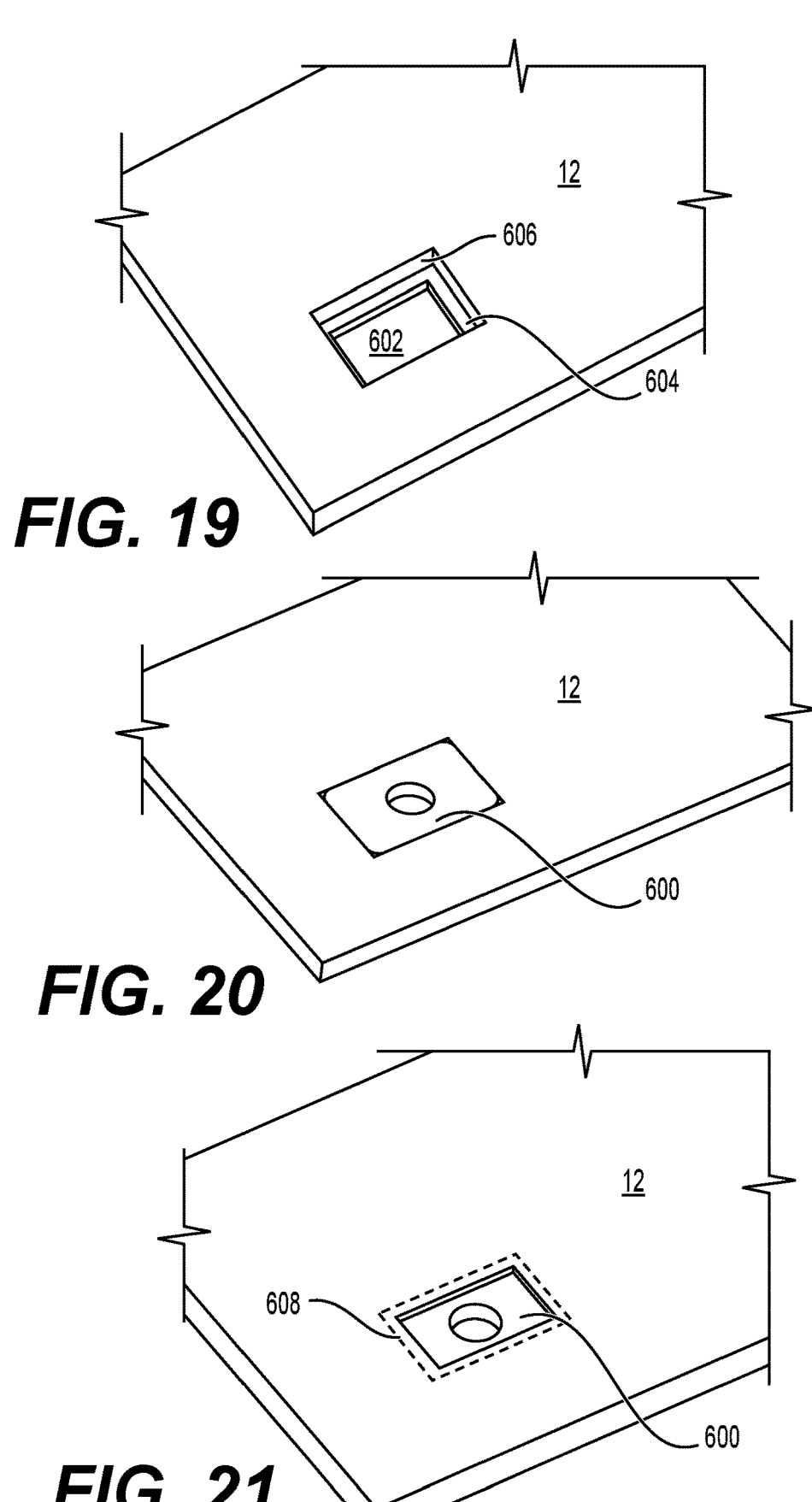

In some embodiments, mechanical interference (e.g., with or without adhesive bonding) may be used to retain insert 600 in place relative to structure 12. An exemplary process for implementing mechanical bonding of insert 600 into structure 12 is illustrated in FIGS. 19, 20, and 21. As shown in FIG. 19, pocket 602 may first be formed to have an end supporting surface 604 and at least one side wall 606 that extends from surface 604 in a direction generally perpendicular to surface 604. In the disclosed embodiment, surface 604 extends only around a periphery of pocket 602 and includes an open center that allows access to a center portion (e.g., an open bore, a threaded interface, etc.) of insert 600. It is contemplated, however, that surface 604 could be a solid surface that completely blocks off one side of insert 600, if desired. Side wall(s) 606 may extend a distance about equal to a thickness of insert 600, such that an upper surface of structure 12 and an upper surface of insert 600 are generally co-planar immediately after insertion of insert 600 into pocket 602. Additional adhesive (e.g., adhesive in addition to the matrix used to form pocket 602) may be applied to surface 604 and/or side wall(s) 606 in preparation for receiving insert 600).

After placement (e.g., manual placement or automatic placement performed by another machine) of insert 600 into pocket 602 (see FIG. 20), fabrication of structure 12 may be complete. However, in some applications, additional composite material may be discharged from head 16 to mechanically lock insert 600 in place. For example, FIG. 21 illustrates at least a border 608 formed around an upper surface of insert 600 that is connected to structure 12. In one example, border 608 is identical to surface 604 (referring to FIG. 19) other than location at an opposing side of insert 600. It is contemplated, however, that border 608 could completely cover the upper surface of insert 600, if desired.

Border 608 may be integral to a layer of structure 12, such that border 608 is flush with the upper surface of structure 12. Alternatively, boarder 608 could extend past the upper surface of structure 12 (e.g., as an extra feature added to structure 12).

INDUSTRIAL APPLICABILITY

The disclosed system and print head may be used to manufacture composite structures having any desired cross-sectional size, shape, length, density, and/or strength. The composite structures may include any number of different reinforcements of the same or different types, diameters, shapes, configurations, and consists, each coated with a common matrix. Operation of system 10 will now be described in detail with reference to FIGS. 1-21.

At a start of a manufacturing event, information regarding a desired structure 12 may be loaded into system 10 (e.g., into controller 20 that is responsible for regulating operations of support 14 and/or head 16). This information may include, among other things, a size (e.g., diameter, wall thickness, length, etc.), a shape, a contour (e.g., a trajectory), surface features (e.g., ridge size, location, thickness, length; flange size, location, thickness, length; etc.) and finishes, connection geometry (e.g., locations and sizes of couplers, tees, splices, etc.), location-specific matrix stipulations, location-specific reinforcement stipulations, compaction requirements, curing requirements, etc. It should be noted that this information may alternatively or additionally be loaded into system 10 at different times and/or continuously during the manufacturing event, if desired.

Based on the component information, one or more different reinforcements and/or matrixes may be selectively loaded into head 16. For example, one or more supplies of reinforcement may be loaded onto creel 19 (referring to FIG. 2) of module 44, and one or more cartridges of matrix may be placed into module 46.

The reinforcements may then be threaded through head 16 prior to start of the manufacturing event. Threading may include passing the reinforcement from module 44 around redirects of module 48 and through module 50. The reinforcement may then be threaded through module 52 and wetted with matrix. Module 52 may then extend to place the wetted reinforcement under module 58. Module 58 may thereafter press the wetted reinforcement against an underlying layer. After threading is complete, head 16 may be ready to discharge matrix-coated reinforcements.

At a start of a discharging event, any available cure sources may be activated to direct cure energy to the discharging material. Module 50 may be deactivated to release the reinforcement, and head 16 may be moved away from a point of anchor to cause the reinforcement to be pulled out of head 16 and at least partially cured. This may continue until discharge is complete and/or until head 16 must move to another location without discharging material during the move.

During discharge of the wetted reinforcements from head 16, module 58 may roll and/or slide over the reinforcements. A pressure may be applied against the reinforcements, thereby compacting and/or wiping the material. The material may be exposed to cure energy during discharge from head 16 and during compacting, such that at least a portion of the material is cured and hardened enough to remain tacked to the underlying layer and/or to maintain its discharged shape and location. In some embodiments, a majority (e.g., all) of the matrix may be cured by exposure to the energy.

It should be noted that the amount of cure energy generated by module 58 may be variable. For example, the energy could be generated at levels that are related to other parameters (e.g., travel speed) of head 16. For instance, as the travel speed of head 16 increases and the discharge rate of reinforcement from head 16 proportionally increases, the amount of energy generated by module 58 and directed toward the discharging material may likewise increase. This may allow a consistent unit of energy to be received by the matrix coating the reinforcement under a range of conditions. It is also possible that a greater unit of energy may be received during particular conditions (e.g., during anchoring, during free-space printing, at particular geometric locations of structure 12, etc.), if desired.

The component information may be used to control operation of system 10. For example, the reinforcements may be discharged from head 16 (along with the matrix), while support 14 selectively moves head 16 in a desired manner during curing, such that an axis of the resulting structure 12 follows a desired trajectory (e.g., a free-space, unsupported, 3-D trajectory). In addition, modules 46 and 52 may be carefully regulated by controller 20 such that the reinforcement is wetted with a precise and desired amount of the matrix.

During payout of matrix-wetted reinforcement from head 16, modules 44 and 48 may together function to maintain a desired level of tension within the reinforcement. It should be noted that the level of tension could be variable, in some applications. For example, the tension level could be lower during anchoring and/or shortly thereafter to inhibit pulling of the reinforcement during a time when adhesion may be lower. The tension level could be reduced in preparation for severing and/or during a time between material discharge. Higher levels of tension may be desirable during free-space printing to increase stability in the discharged material. Other reasons for varying the tension levels may also be possible.

At completion of a discharging event, module 58 may be selectively activated to sever the reinforcement.

It will be apparent to those skilled in the art that various modifications and variations can be made to the disclosed system. Other embodiments will be apparent to those skilled in the art from consideration of the specification and practice of the disclosed system. It is intended that the specification and examples be considered as exemplary only, with a true scope being indicated by the following claims and their equivalents.

What is claimed is:

1. An additive manufacturing system, comprising:
a support; and
a print head operatively connected to and moveable by the support, the print head including:
a first module configured to discharge a path of material within a layer;
a second module configured to compact the path of material with a compaction pressure as the path of material discharges from the first module; and
a controller in communication with the second module and configured to:
determine a characteristic of the material within the layer while the path of material is being discharged; and
selectively adjust a force of the second module while the path of material is being discharged based on the characteristic such that the compaction pressure applied by the second module on the path of material remains constant.

2. The additive manufacturing system of claim 1, wherein:
discharging the path of material includes discharging the material as a path adjacent at least one previously discharged path; and
the characteristic is associated with a number of paths, including the path and the at least one previously discharged path, that are simultaneously compacted by the second module.

3. The additive manufacturing system of claim 2, wherein when the print head discharges the path of material as a path adjacent an existing surface within the layer, the characteristic is a sum of a width of the path and a dimension of the existing surface simultaneously engaged by the second module with the path.

4. The additive manufacturing system of claim 3, wherein:
the second module includes a wheel that rolls over the path and the existing surface; and
the dimension of the existing surface is a dimension in an axial direction of the wheel.

5. The additive manufacturing system of claim 1, wherein the characteristic is a dimension.

6. The additive manufacturing system of claim 5, wherein the dimension is a dimension of the material before the material is compacted.

7. The additive manufacturing system of claim 5, wherein the force is adjusted to apply the constant pressure defined in claim 1 to the material regardless of the dimension.

8. The additive manufacturing system of claim 5, wherein the dimension is a width of the material being compacted.

9. The additive manufacturing system of claim 8, wherein the width is a known value stored within a memory of the controller.

10. The additive manufacturing system of claim 8, further including a sensor mounted to the print head and configured to detect the width.

11. The additive manufacturing system of claim 8, wherein the controller is configured to determine the width based on monitored operation of the print head.

12. An additive manufacturing system, comprising:
a support; and
a print head operatively connected to and moveable by the support, the print head including:
a first module configured to discharge a path of material within a layer;
a second module configured to compact the path of material with a compaction pressure as the path of material discharges from the first module; and
a controller in communication with the second module and configured to:
cause the second module to compact the path of material with a first force when the path of material is a sole path of material being compacted; and
cause the second module to apply a second force that is greater than the first force when the path of material is being simultaneously compacted together with another path of material within the same layer by the second module, wherein the first and second forces cause the path of material to be compacted with a same pressure throughout the layer during discharge when the path of material is the sole path and when the path of material is being compacted together with the another path of material.

13. The additive manufacturing system of claim 12, wherein the second module includes a wheel that rolls over the path.

14. The additive manufacturing system of claim 12, wherein the controller is configured to adjust the second force based on a combined width of paths within the same layer being simultaneously compacted with the path of material being discharged and the another path of material.

15. The additive manufacturing system of claim 14, wherein the width of the combined width is a known value stored within a memory of the controller.

16. The additive manufacturing system of claim 14 further including a sensor mounted to the print head and configured to detect the combined width.

17. The additive manufacturing system of claim 14, wherein the controller is configured to determine the combined width based on monitored operation of the print head.

18. An additive manufacturing system, comprising:
    a support; and
    a print head operatively connected to and moveable by the support, the print head including:
        a first module configured to discharge a path of material within a layer;

a second module configured to compact the path of material as it discharges from the first module; and
    a controller in communication with the second module and configured to:
        cause the second module to exert a first force when the path of material is a sole path of material being compacted; and
        cause the second module to exert an incrementally increasing second force that is greater than the first force as a greater number of paths of material, including the path of material, are being simultaneously compacted, such that the path of material is compacted with a same pressure throughout the layer regardless of an existence of adjacent paths of materials being simultaneously compacted together with the path of material in the layer.

19. The additive manufacturing system of claim 17, wherein a magnitude of the increase is the same for each additional path of material being simultaneously compacted.

* * * * *